US00RE40340E

(19) United States
(12) Reissued Patent
Ghaly

(10) Patent Number: US RE40,340 E
(45) Date of Reissued Patent: May 27, 2008

(54) ELECTRONIC HAND HELD LOGIC GAME

(76) Inventor: Nabil N. Ghaly, 14 Longwood Dr., South Huntington, NY (US) 11746

(21) Appl. No.: 08/962,971

(22) Filed: Oct. 27, 1997

Related U.S. Patent Documents

Reissue of:
(64) Patent No.: 5,286,037
Issued: Feb. 15, 1994
Appl. No.: 07/754,465
Filed: Sep. 3, 1991

U.S. Applications:
(63) Continuation of application No. 08/376,789, filed on Jan. 23, 1995, now abandoned.

(51) Int. Cl.
*A63F 9/24* (2006.01)
*A63F 9/06* (2006.01)
*A63F 7/04* (2006.01)
*A63F 3/00* (2006.01)

(52) U.S. Cl. ..... 273/153 R; 273/460; 273/433; 273/153; 273/85 G

(58) Field of Classification Search ..... 273/153, 273/237
See application file for complete search history.

(56) References Cited

U.S. PATENT DOCUMENTS 2,870,549 A 1/1959 Craine ..... 35/22
3,367,653 A 2/1968 Brown
3,417,995 A 12/1968 Creely (Continued)

FOREIGN PATENT DOCUMENTS

SU 0876142 * 10/1981 ..... 273/153 R
SU 1202604 * 1/1986 ..... 273/153 R
SU 1454489 * 1/1989 ..... 273/433

OTHER PUBLICATIONS

Parker Brothers Instruction Booklet for its product, "Merlin", Magic Square Game, 1978.*
Internet Document—http:new:arcusainc.com/84271index.html–ARC—USA, Inc.—Keypads.
Internet Document—www.NYX.NET/~LTURNER/Public_HTML/TMS1000INS.HTML—Instruction Set for Texas Instruments TMS1000.

(Continued)

*Primary Examiner*—Robert Pezzuto
*Assistant Examiner*—Sunit Pandya

(57) ABSTRACT

An electronic game, method and apparatus, is disclosed which includes individually operable electric switches to control the device, and electric light emitting means to provide multi-color displays. The object of the game is for the player to manipulate the switches until all multi-color displays indicate the same color. The device functions by matching electrical operating codes, transmitted from its left and bottom edges, with electrical operating codes stored at its top and right edges, to generate electrical color codes. The electric switches control the routing of the operating codes within the device, and the distribution of the color codes to the multi-color displays. In the preferred embodiment, the device utilizes a microprocessor to control the progress of the game, monitor the position of electric switches, and control the display of multi-color indications. The microprocessor also controls the generation of operating codes, the routing of operating codes from the left and bottom edges to the top and right edges, the determination of color codes at the top and right edges, and the distribution of those color codes from the top and right edges to the multi-color displays. The preferred embodiment also includes multi-color lighted switches to implement the electric control switches and the multi-color displays. The device also comprises an electric control means to select a new game, provisions to varry the level of difficulty of any particular game, and means to generate audible signals.

44 Claims, 23 Drawing Sheets

GEOMETRIC LAYOUT OF DEVICE FOR N = 4

U.S. PATENT DOCUMENTS

| | | | | | |
|---|---|---|---|---|---|
| 3,779,553 | A | | 12/1973 | Secter | |
| 3,982,764 | A | | 9/1976 | Dieball | |
| 4,169,592 | A | | 10/1979 | Hall | 273/1 E |
| 4,216,965 | A | * | 8/1980 | Morrison et al. | 463/10 |
| 4,513,973 | A | * | 4/1985 | Sinclair | 273/237 |
| 4,575,087 | A | * | 3/1986 | Sinclair | 273/153 R |
| 4,809,979 | A | * | 3/1989 | Skowronski et al. | 463/9 |
| 4,957,291 | A | * | 9/1990 | Miffitt et al. | 463/9 |
| 5,573,245 | A | | 11/1996 | Weiner et al. | |
| 5,603,500 | A | | 2/1997 | Olti et al. | |
| 6,861,962 | B2 | | 3/2005 | Spencer | |
| 6,912,280 | B2 | | 6/2005 | Henry | |
| D507,568 | S | | 7/2005 | Schlieffers et al. | |
| 6,920,339 | B1 | | 7/2005 | Choy et al. | |
| 6,930,260 | B2 | | 8/2005 | Clegg et al. | |
| 6,948,869 | B2 | | 9/2005 | Macor | |
| 6,950,680 | B2 | | 9/2005 | Kela et al. | |
| 6,968,206 | B1 | | 11/2005 | Whitsey-Anderson | |
| 6,976,916 | B2 | | 12/2005 | Burrel et al. | |
| 6,989,732 | B2 | | 1/2006 | Fisher | |

OTHER PUBLICATIONS

Internet Document—http://www.cacs.louisiana.edu/~mgr/404/burks/pcinfo/hardware/cpu.html—Description of the Texas Instrument TMS1000 microcontroller, Indicating the use of "hardwired" instructions.

Text Book: Digital Systems Logic and Circuits, Author: B. Zacharov, Publisher: American Elsevier Pub. Co., Inc. 1968 pp. 53 & 83—show the symbol ⊙ describing the Coincedence Boolean Operator $\overline{AB}$=AB.

Text Book: Digital Design. 2$^{nd}$ Edition, Author: M. MorRise Mano, Publisher: Prentice Hall, 1991—New Jersey pp. 56 & 57—show the Symbol ⊙ describing the equivalence Boolean operator xy=x'y'.

Text Book: Digital Computer Design Fundamentals, Author: Joahan Chu, Publisher: McGraw–Hill, 1962 pp. 112 &113—show the symbol ⊙ describing the Coincidence Boolean Operator $\overline{AB}$=AB.

Dictionary Definitions for the term "Keypad" Webster's New World College Dictionary, Fourth Edition—p. 785, Michael Agnes, Editor In Chief.

Internet Document: http://Patentlaw.typepad.com/Patent/2004/10/can_dependant_C.html, Article dated Oct. 13, 2004, analyzing Ghaly v. Hasbro—By Dennis Crouch.

Dictionary Definition of the term "Push Button" Random House Webster's College Dictionary, p. 1097.

Parker Brothers Instruction Booklet for its product, "Merlin", Magic Square Game, 1978.

* cited by examiner

| OBJECT | ○ | ⬡ | □ | △ | ● | ⬢ | ■ | ▲ |
|---|---|---|---|---|---|---|---|---|
| OP-CODE | 000 | 001 | 010 | 011 | 100 | 101 | 110 | 111 |

GEOMETRIC LAYOUT OF DEVICE FOR N = 4

SWITCH $W_{i,j'}$ ON ("1")

SWITCH $W_{i,j'}$ OFF ("0")

LEGEND: ** OP-CODE
*** COLOR CODE

ROUTING SQUARE $S_{i,j}$

HAND HELD LOGIC GAME DEVICE

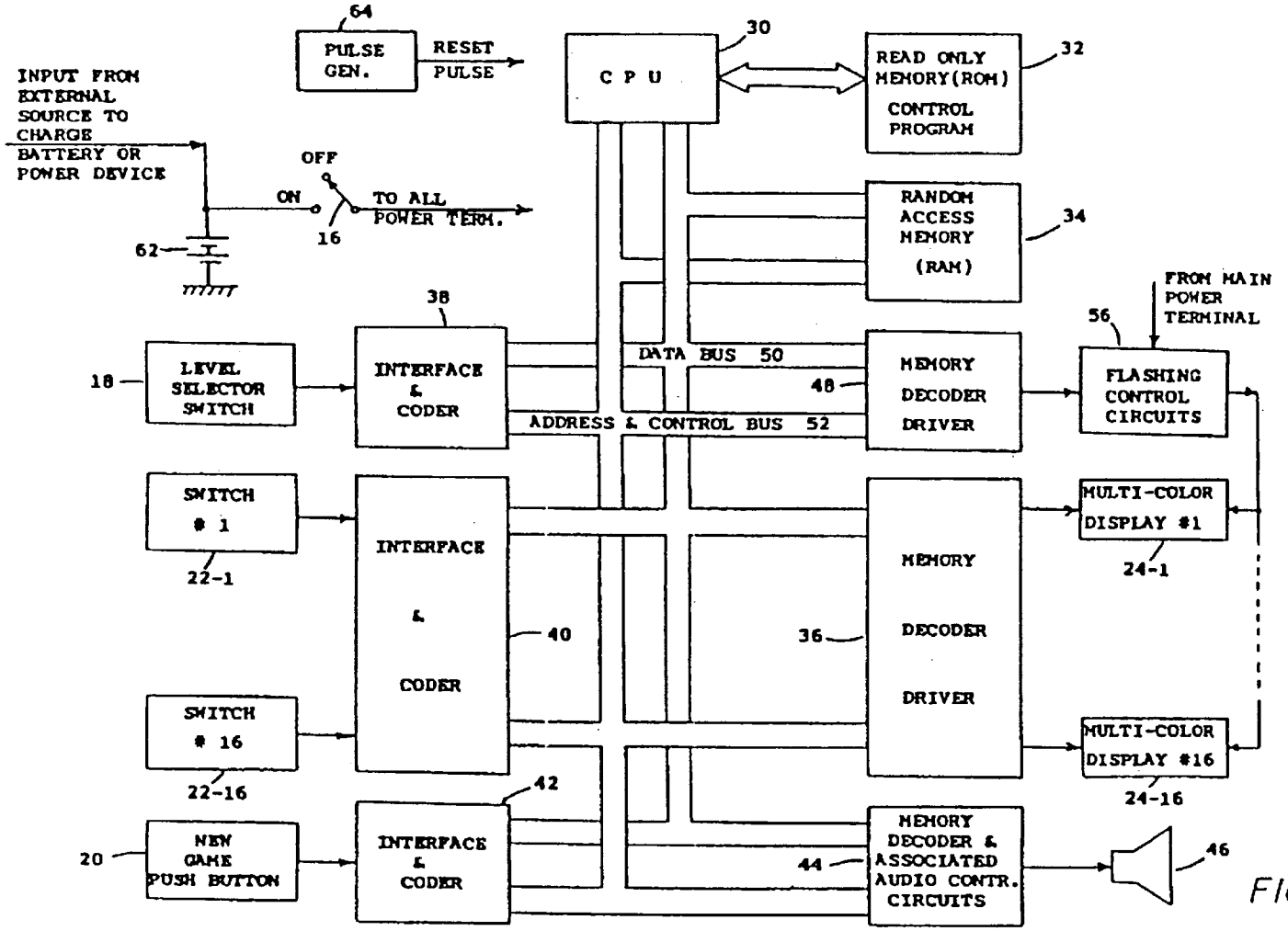
FIG. 4
READ ONLY MEMORY (ROM) CONTROL PROGRAM
32
RANDOM ACCESS MEMORY (RAM)
34
FROM MAIN POWER TERMINAL
FLASHING CONTROL CIRCUITS
56
MULTI-COLOR DISPLAY #1
24-1
MULTI-COLOR DISPLAY #16
24-16
46
MEMORY DECODER DRIVER
48
MEMORY DECODER DRIVER
36
MEMORY DECODER & ASSOCIATED AUDIO CONTR. CIRCUITS
44
30
C P U
DATA BUS 50
ADDRESS & CONTROL BUS 52
40
42
38
INTERFACE & CODER
INTERFACE & CODER
INTERFACE & CODER
RESET PULSE
PULSE GEN.
64
TO ALL POWER TERM.
OFF
ON
16
LEVEL SELECTOR SWITCH
18
SWITCH # 1
22-1
SWITCH # 16
22-16
NEW GAME PUSH BUTTON
20
62
INPUT FROM EXTERNAL SOURCE TO CHARGE BATTERY OR POWER DEVICE

LEGEND

N : DIMENSION OF LOGIC GAME = NUMBER OF PREDETERMINED COLORS WHICH MAY BE DISPLAYED.
= 4 (FOR THE PREFERED EMBODIMENT)

n : NUMBER OF BINARY BITS IN OPCODE AND COLOR CODE.
= ln N + 1 = 3 (FOR THE PREFERED EMBODIMENT)

I : ROW NUMBER I, I = 1, ..., N

J : COLUMN NUMBER J, J = 1, ..., N

DIR : ROUTE DIRECTION BETWEEN TWO ADJACENT ROUTING SQUARES;
"R" DENOTES RIGHT
"U" DENOTES UP
"L" DENOTES LEFT
"D" DENOTES DOWN

T : OPCODE TRANSMITTER; T = 1, ..., 2N

R : OPCODE RECEIVER; R = 1, ..., 2N

RC(T) : RECEIVER CONNECTED TO TRANSMITTER "T"

TC(R) : TRANSMITTER CONNECTED TO RECEIVER "R"

W(I,J) : STATUS OF SWITCH LOCATED AT ROW "I" AND COLUMN "J"

TCODE(T): OPCODE AT TRANSMITTER "T"

RCODE(R): OPCODE AT RECEIVER "R"

C(R) : COLOR CODE AT RECEIVER "R"

x(i) : THE ith BIT OF OPCODE "X"

y(i) : THE ith BIT OF OPCODE "Y"

cb(i) : THE ith BIT OF COLOR CODE "C"

C1(I,J) : COLOR CODE AT THE RIGHT EDGE OF THE ROUTING SQUARE LOCATED AT ROW "I" AND COLUMN "J"

C2(I,J) : COLOR CODE AT THE TOP EDGE OF THE ROUTING SQUARE LOCATED AT ROW "I" AND COLUMN "J"

C(I,J) : COLOR CODE SELECTED FOR DISPLAY AT THE ROUTING SQUARE LOCATED AT ROW "I" AND COLUMN "J"

$\oplus$ : EXCLUSIVE OR BOOLEAN FUNCTION $\odot$ : INCLUSIVE OR BOOLEAN FUNCTION

EXPLANATION OF PROGRAM VARIABLES OF FIGS. 19 - 22

FIG. 18

NOTE:

* SEE FIGURE 18 FOR EXPLANATION OF PROGRAM VARIABLES.

NOTE:

* SEE FIGURE 18 FOR EXPLANATION OF PROGRAM VARIABLES.

| OPCODE | 000 | 001 | 010 | 011 | 100 | 101 | 110 | 111 |
|---|---|---|---|---|---|---|---|---|
| 000 | | | | | | | | |
| 001 | | | | | | | | |
| 010 | | | | | | | | |
| 011 | | | | | | | | |
| 100 | | | | | | | | |
| 101 | | | | | | | | |
| 110 | | | | | | | | |
| 111 | | | | | | | | |

| COLOR CODE | 100 | 101 | 110 | 111 |
|---|---|---|---|---|
| COLOR | | | | |

COLOR ASSIGNMENTS FOR N = 4

FIG. 23

| OP-CODE | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | | | | | | | | | | | | | | | | |
| 0001 | | | | | | | | | | | | | | | | |
| 0010 | | | | | | | | | | | | | | | | |
| 0011 | | | | | | | | | | | | | | | | |
| 0100 | | | | | | | | | | | | | | | | |
| 0101 | | | | | | | | | | | | | | | | |
| 0110 | | | | | | | | | | | | | | | | |
| 0111 | | | | | | | | | | | | | | | | |
| 1000 | | | | | | | | | | | | | | | | |
| 1001 | | | | | | | | | | | | | | | | |
| 1010 | | | | | | | | | | | | | | | | |
| 1011 | | | | | | | | | | | | | | | | |
| 1100 | | | | | | | | | | | | | | | | |
| 1101 | | | | | | | | | | | | | | | | |
| 1110 | | | | | | | | | | | | | | | | |
| 1111 | | | | | | | | | | | | | | | | |

| COLOR CODE | 1000 | 1001 | 1010 | 1011 | 1100 | 1101 | 1110 | 1111 |
|---|---|---|---|---|---|---|---|---|
| COLOR | | | | | | | | |

COLOR ASSIGNMENTS FOR N = 8

FIG. 24

ELECTRONIC HAND HELD LOGIC GAME

Matter enclosed in heavy brackets [ ] appears in the original patent but forms no part of this reissue specification; matter printed in italics indicates the additions made by reissue.

*This application is a continuation REI of Ser. No. 08/376,789 filed Jan. 23, 1995 now abandoned, which is a REI of Ser. No. 07/754,465 filed Sep. 3, 1991 now U.S. Pat. No. 5,286,037.*

BACKGROUND OF THE INVENTION

This invention relates generally to an electronic game and in particular to an electronic logic game wherein a plurality of electric switches and multi-color displays are provided. It is possible, by depressing the switches in a particular manner or pattern, and by observing the resulting colors displayed, to determine the pattern of switches which results in a singular color being indicated on all multi-color displays.

Various logic games are known wherein a plurality of playing pieces of various colors are connected together in a geometric shape, and are manipulated by the player so that pieces of the same color are grouped together. However, such logic games are of mechanical designs and to the inventor's knowledge have never been implemented by "state of the art" electronics, i.e. integrated circuits, etc., which are presently available.

Logic games are generally based on logic problems and can, therefore, be solved using a systematic approach, wherein a player, who is familiar with the logic problem of a particular game, observes the effect caused by a move or a sequence of moves of playing pieces, to determine the next logical steps in the game, and ultimately discover a solution to the problem.

Accordingly, one object of the present invention is to define a logic problem upon which a game may be based, and to provide an electronic device with a field of play whereon a player may discover a solution to the logic problem using the cause/effect characteristics of logic games.

It is another object of this invention to provide an electronic game utilizing electric switching means to control the colors indicated on multi-color displays, and wherein a player must determine the exact combination of switches that results in a singular color being indicated on all multi-color displays.

It is another object of the present invention to provide an electronic game that utilizes a microprocessor to provide a plurality of games by automatically generating random code patterns, and to control the progress of the game.

It is still another object of the present invention to provide an electronic logic game which employs means for varying the level of difficulty of any particular game.

It is still a further object of the present invention to provide an electronic logic game which provides a variety of visual and audible signals to highten the enjoyment of the game.

It is still an other object of the present invention to provide a hand held electronic logic game having a liquid crystal display whereon a plurality of geometric shapes may be depicted in various colors.

SUMMARY OF THE INVENTION

The foregoing and other objects of the invention are accomplished by an electronics logic game which, for demonstration purposes, is graphically represented in FIG. 1 as a geometric square. The section titled "Mathematical Description of the Logic Problem", below, provides definitions and a theoretical description of the logic problem upon which an object of the electronic game herein is based.

Thus the present invention relates to an electronic game comprising means for generating electrical operating codes, a plurality of electrical switches to control the routing of operating codes within the device, means to route or simulate the routing of operating codes within the device, means to implement a logic [b]*B*oolean function to generate color codes from pairs of operating codes, means to distribute color codes to multi-color displays, and plurality of multi-color light emitting means to provide multi-color displays.

The present invention defines the logic problem of matching a plurality of objects placed at the left and bottom edges of a square with identical objects placed at its top and right edges, using a plurality of playing pieces, defined as routing squares, to determine the internal routes within the square which interconnect all pairs of objects that belong to a predetermined subset of all possible pairs of said objects.

The present invention also relates to a method of solving the logic problem herein, comprising the definitions of the Routing Square and associated binary switches, designating a color to each predetermined subset of pairs of objects, causing the color associated with each subset to be displayed at multi-color displays according to the position of binary switches, *or the states of the routing squares,* and observing said color displays for different combinations of said switches whereby a combination associated with one subset may be discovered.

In accordance with a preferred embodiment of the invention, there is provided a device having a field of play arranged in an array of multi-color lighted switches on which a player attempts to discover the combination of switch positions which cause a singular color to be displayed on the field of play. The device utilizes a microprocessor programmed to generate random operating code patterns that correspond to objects placed along the edges of a square, simulate the routing of the operating codes from the left and bottom edges to the right and top edges of said square, generate color codes from pairs of operating codes, distribute color codes to multi-color displays, and control the progress of the game. The microprocessor is also programmed to monitor the position of the switches, control the display of multi-color indications, and generate distinct tone sequences representing color melodies and game completion melody. The microprocessor is also programmed to varry the degree of difficulty of each game by randomly rearranging either the switches which control the routing squares, the multi-color displays or both.

In an alternative embodiment, the device comprises a liquid crystal display whereon a plurality of geometric shapes may be depicted and wherein a player attempts to discover a pattern of switch positions that results in a singular geometric shape being depicted at all locations on the liquid crystal display.

In other alternative embodiments, the device comprises an interface module to provide multi-color displays on an external color video monitor.

BRIEF DESCRIPTION OF THE DRAWINGS

These and other more detailed and specific objectives will be disclosed in the course of the following description taken in conjunction with the accompanying drawings wherein:

FIG. 4 is a block diagram of the circuit utilized by the present invention.

FIG. 18 indicates legends and explanations of the program variables utilized in the logical flow diagrams of FIGS. 19-22.

FIGS. 23 and 24 provide proposed operating code and color code assignments, [using the EXCLUSIVE OR boolean function for four and eight color games respectively"] *in the form of a lookup table.*

DESCRIPTION OF THE PREFERRED EMBODIMENT

Figure 3:
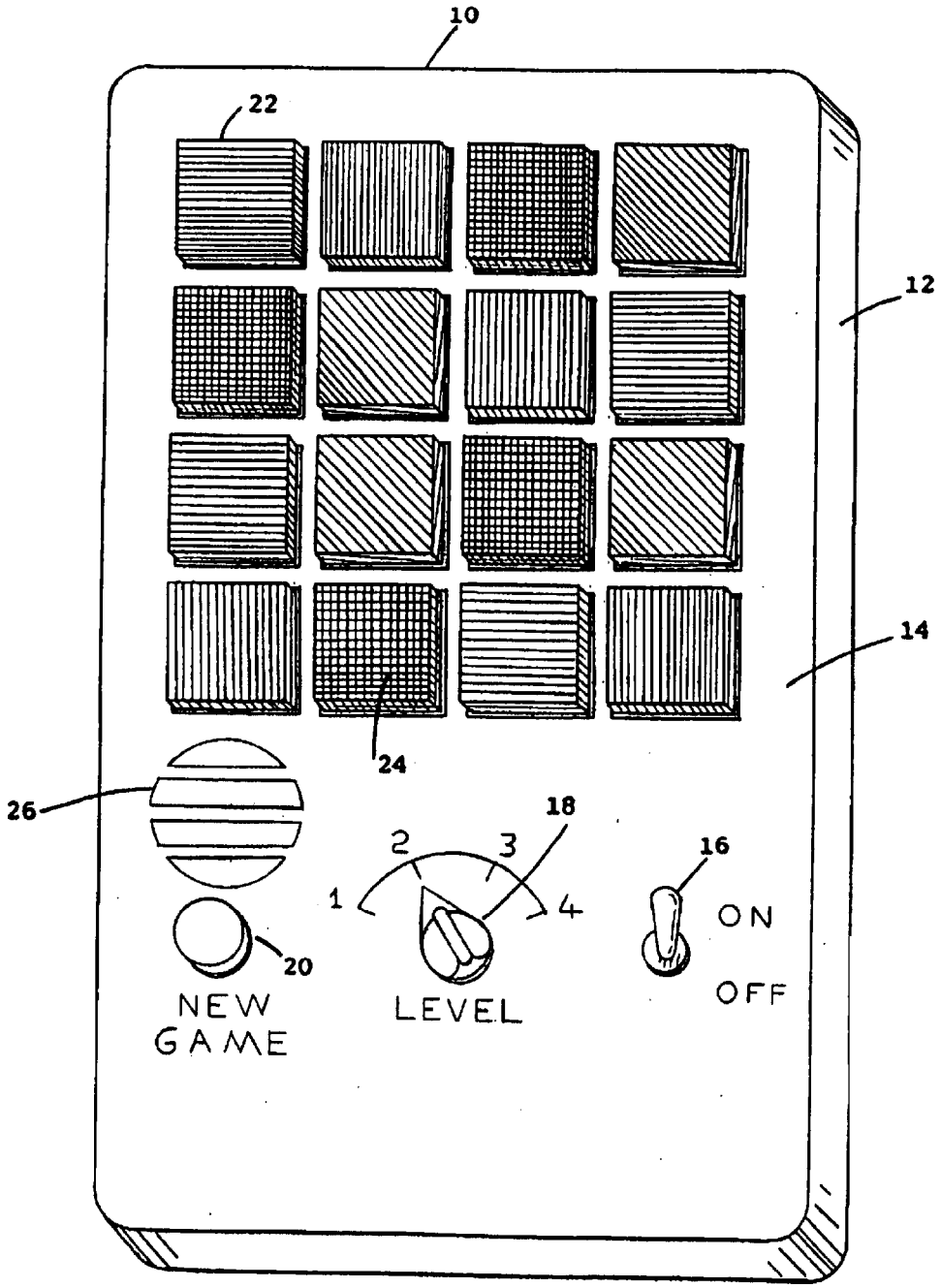
FIG. 3 is a perspective view of the preferred embodiment of a device according to the invention.
Figure 5:
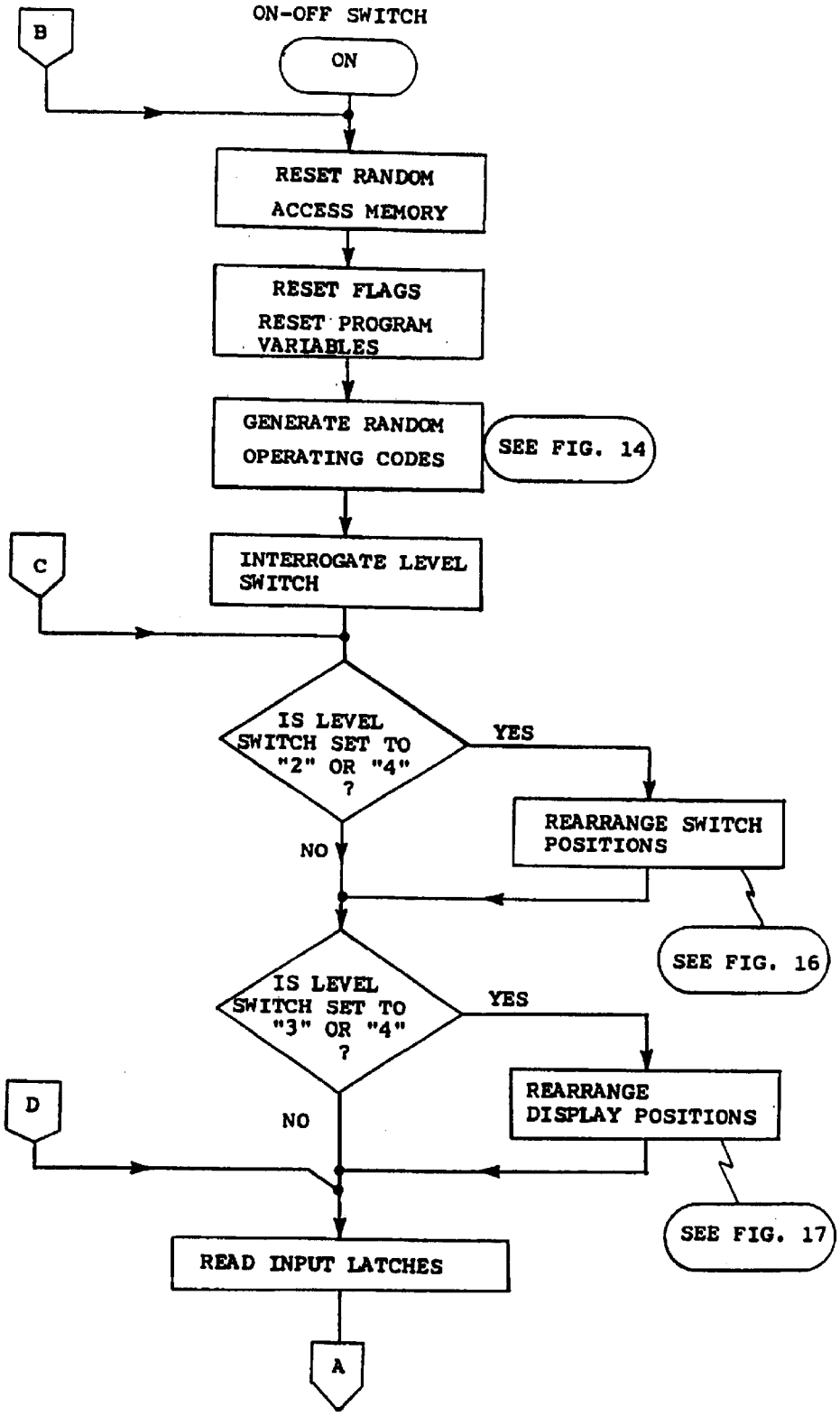
FIGS. 5 through 12 are logical flow diagrams illustrating the main program functions performed by the microprocessor controlling the operation of the game according to the invention.
Figure 6:
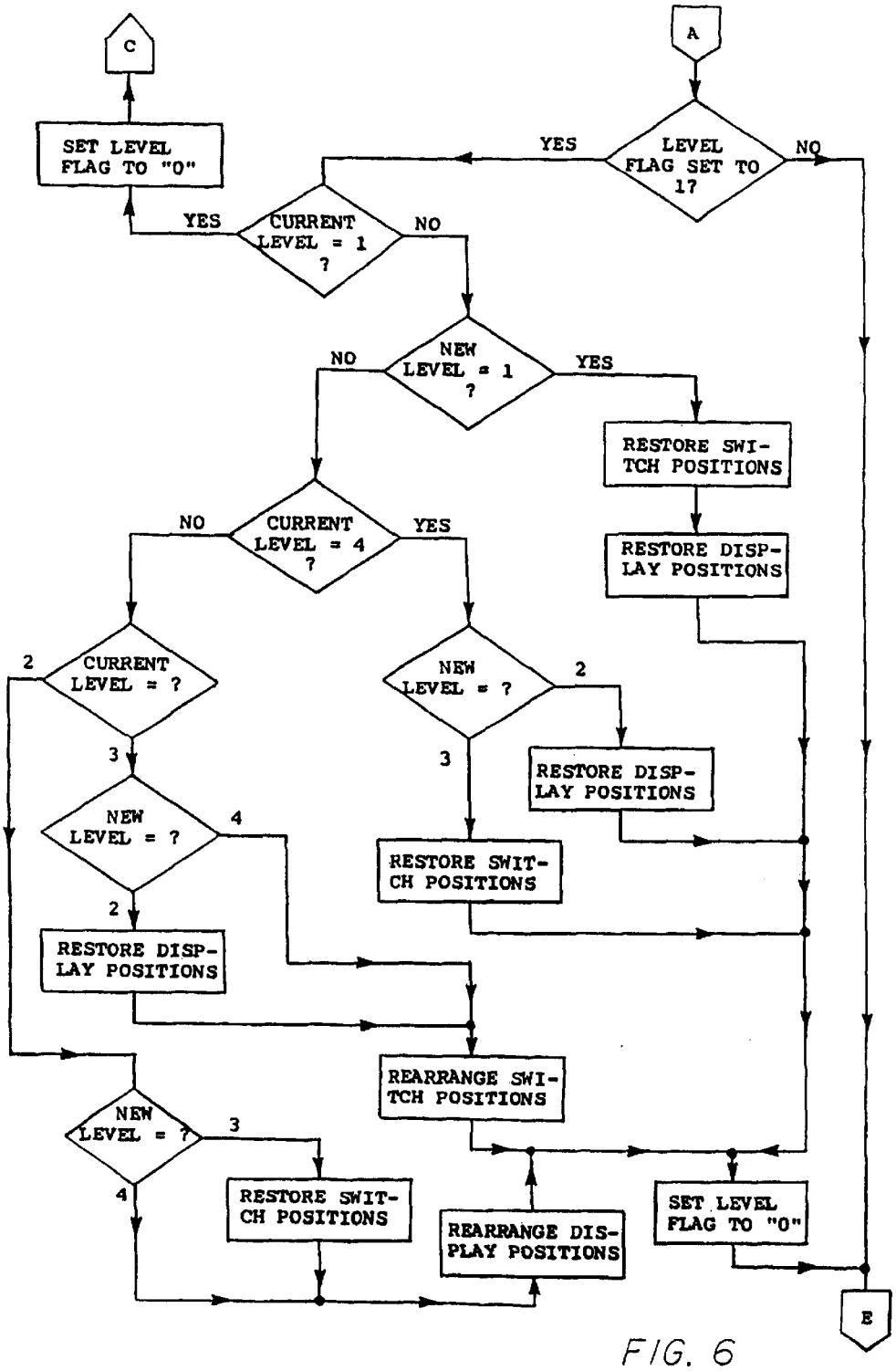
Figure 7:
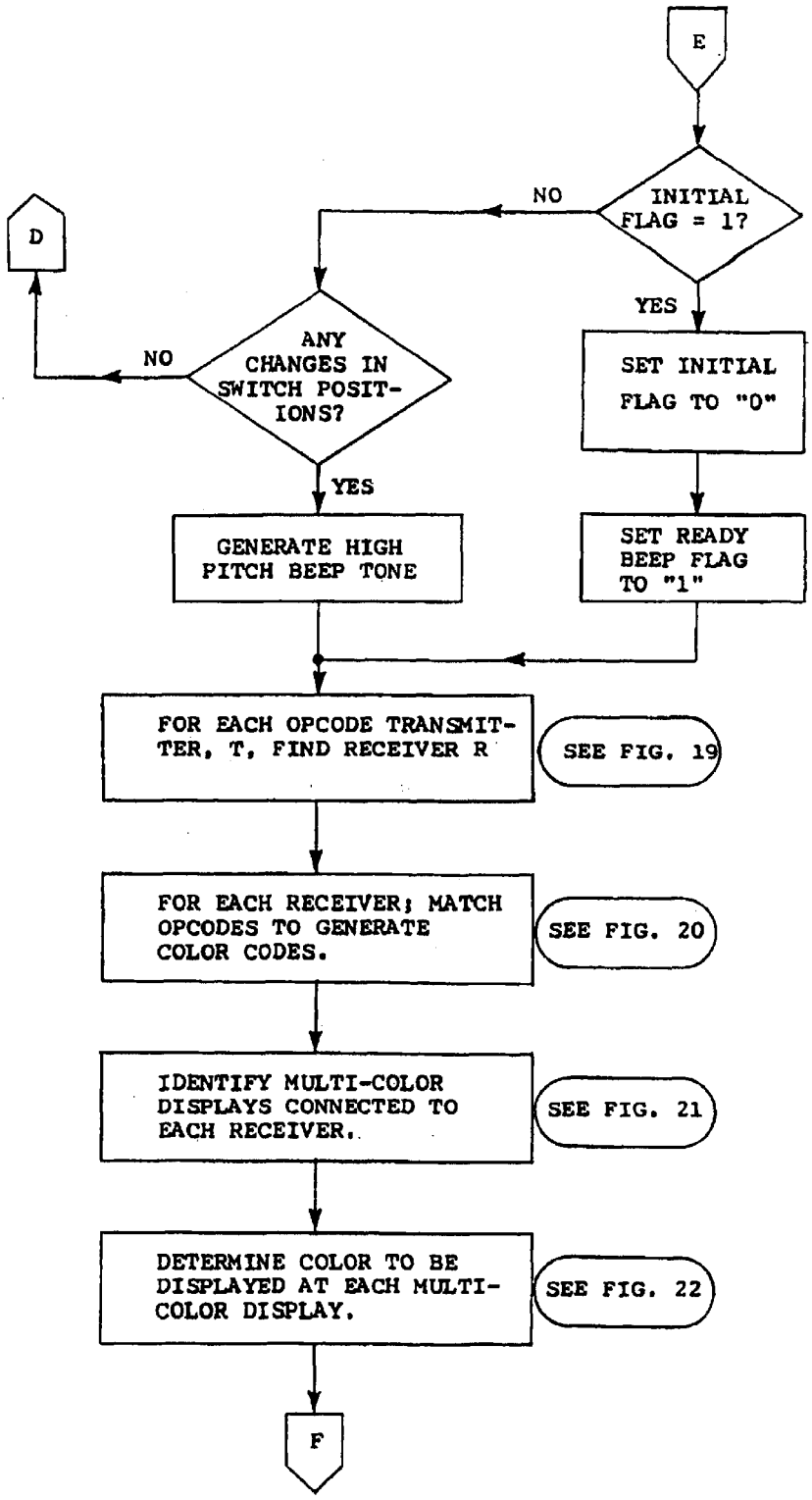
Figure 8:
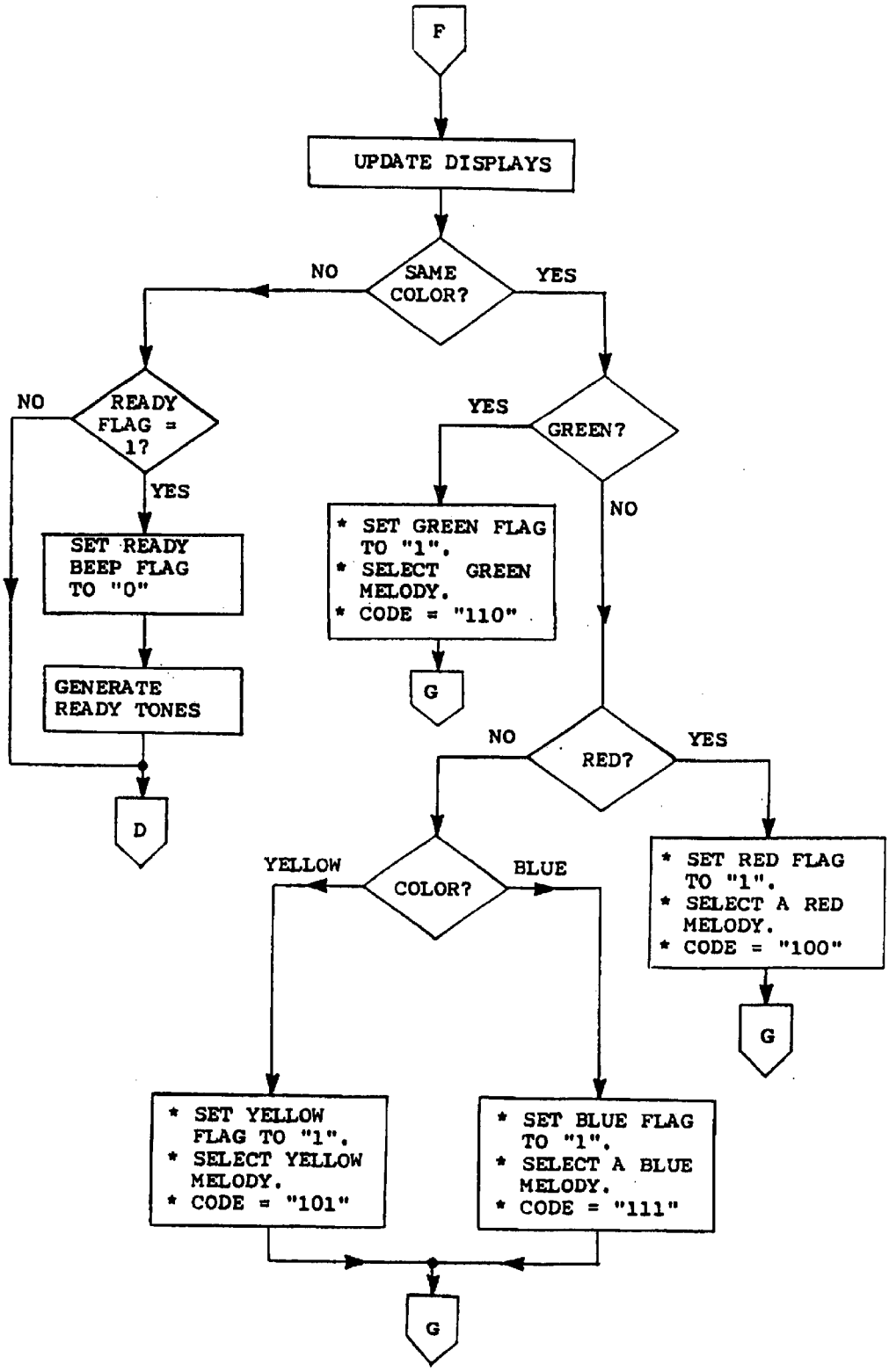
Figure 9:
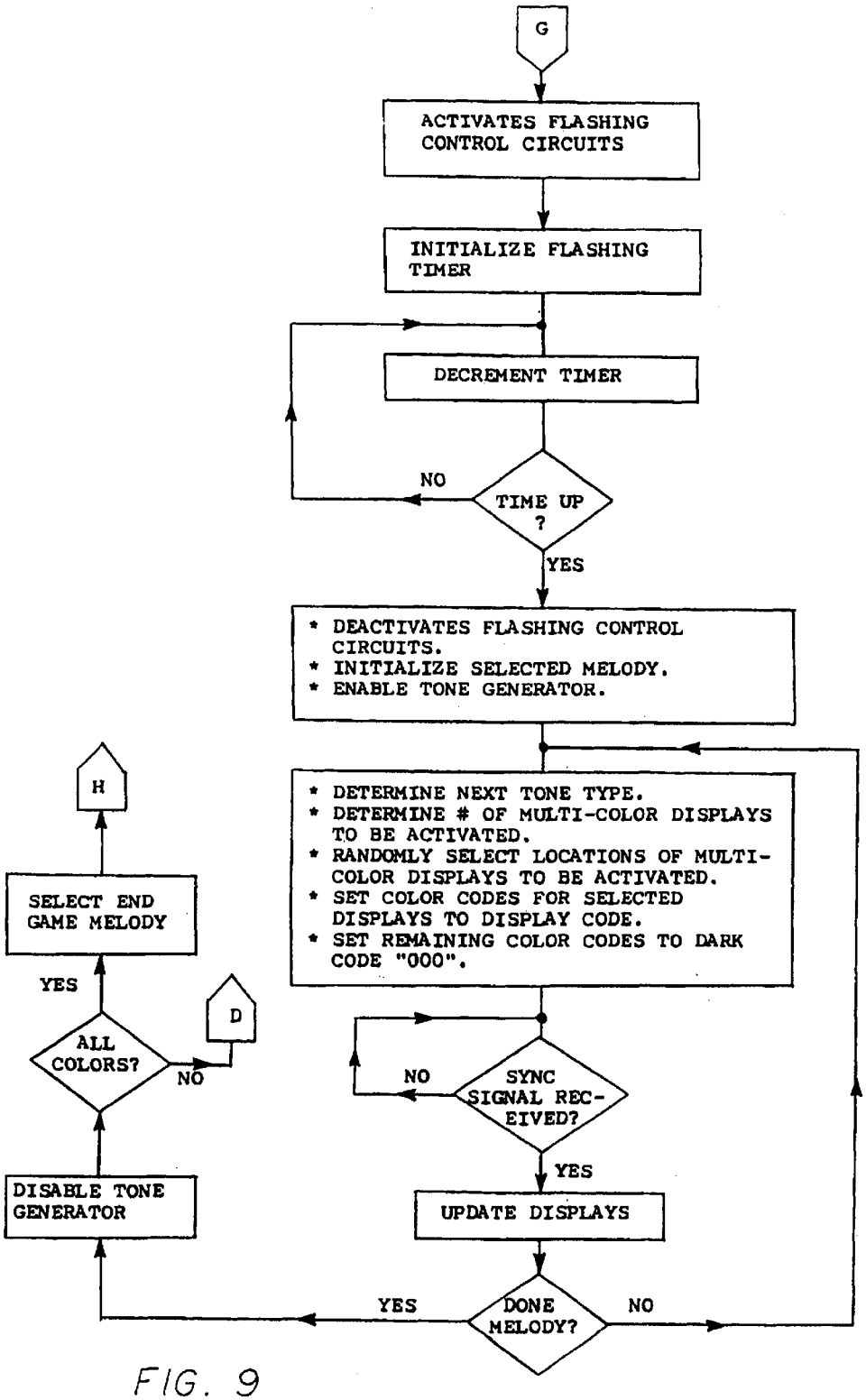
Figure 10:
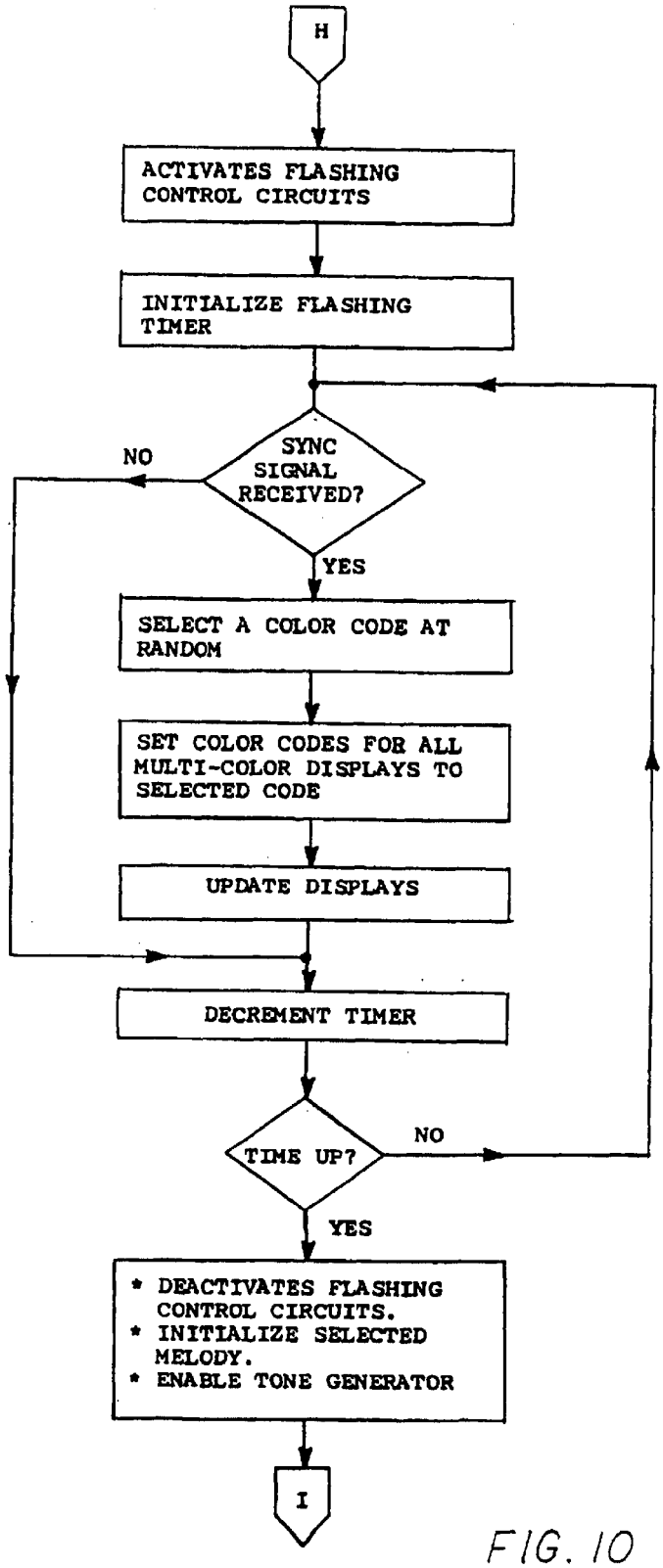
Figure 11:
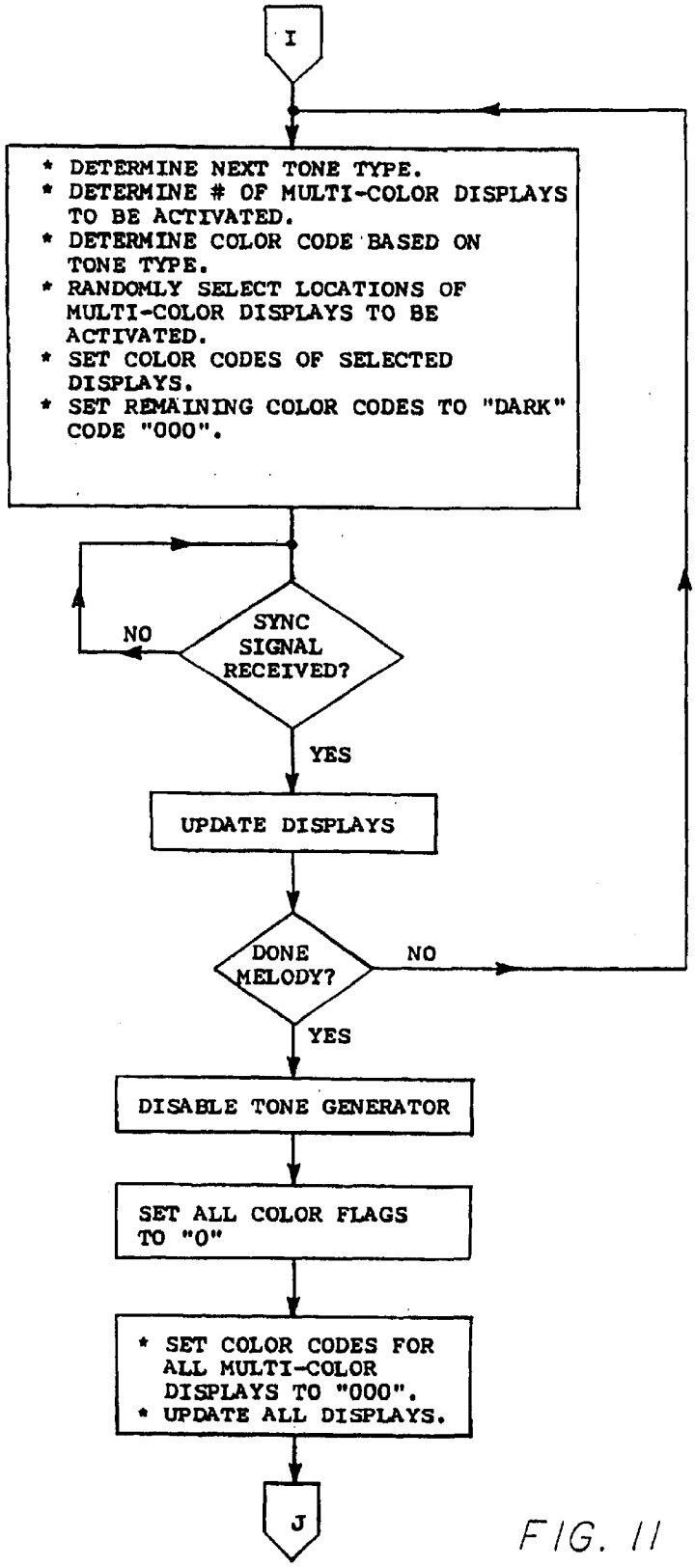
Figure 12:
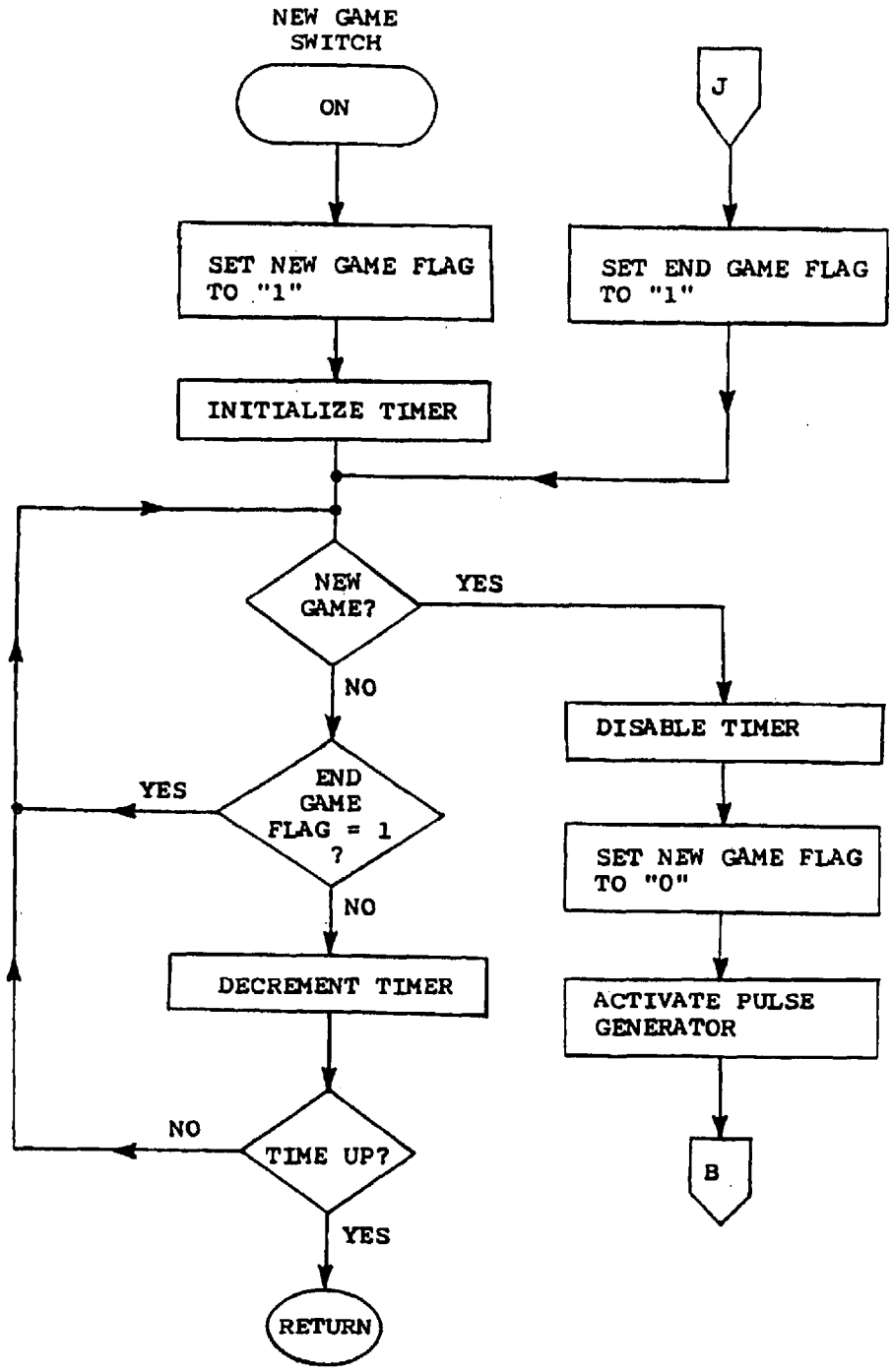
Figure 13:
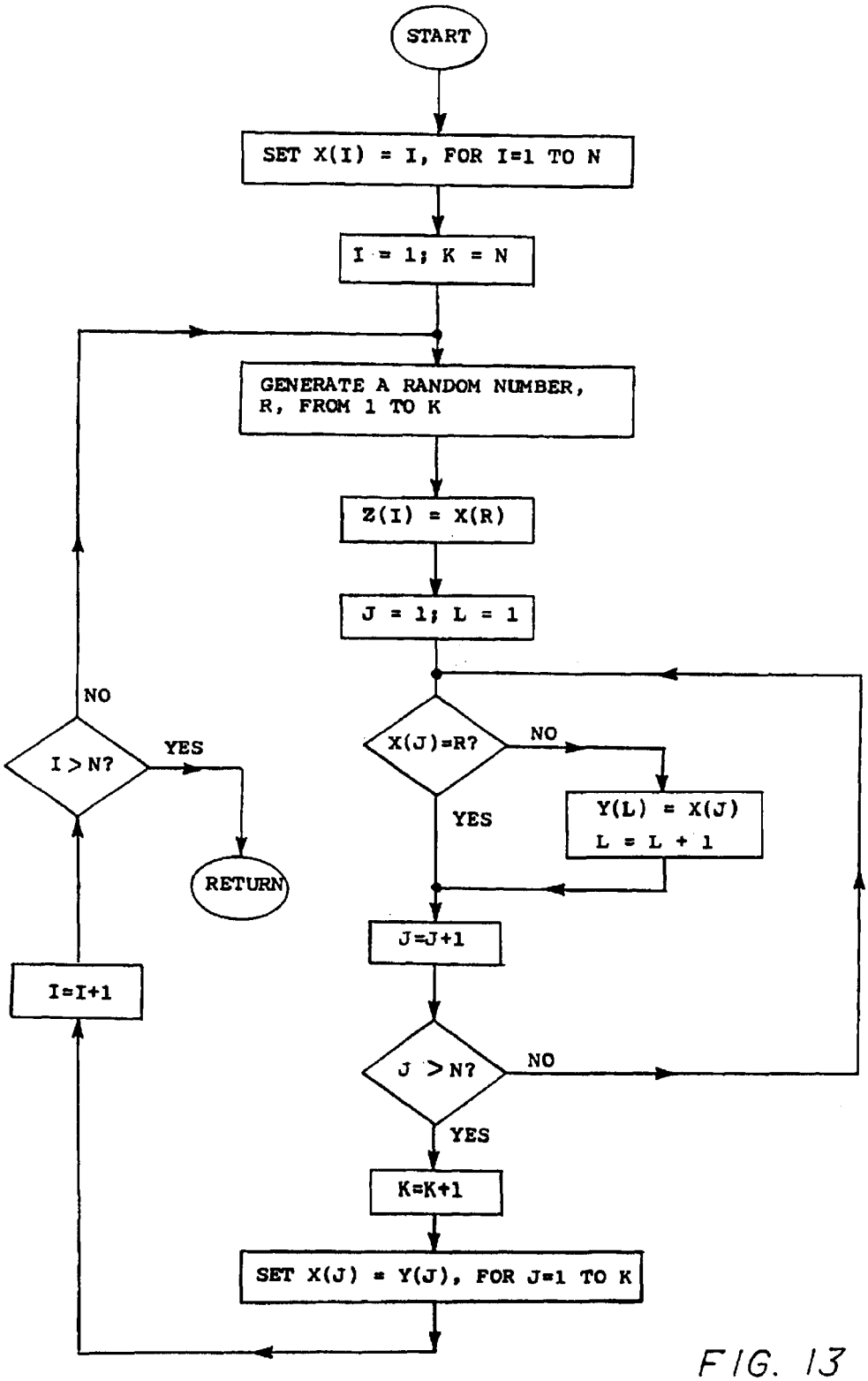
FIG. 13 illustrates a flow diagram of the logic steps utilized by the present invention to generate a set of N random numbers.
Figure 14:
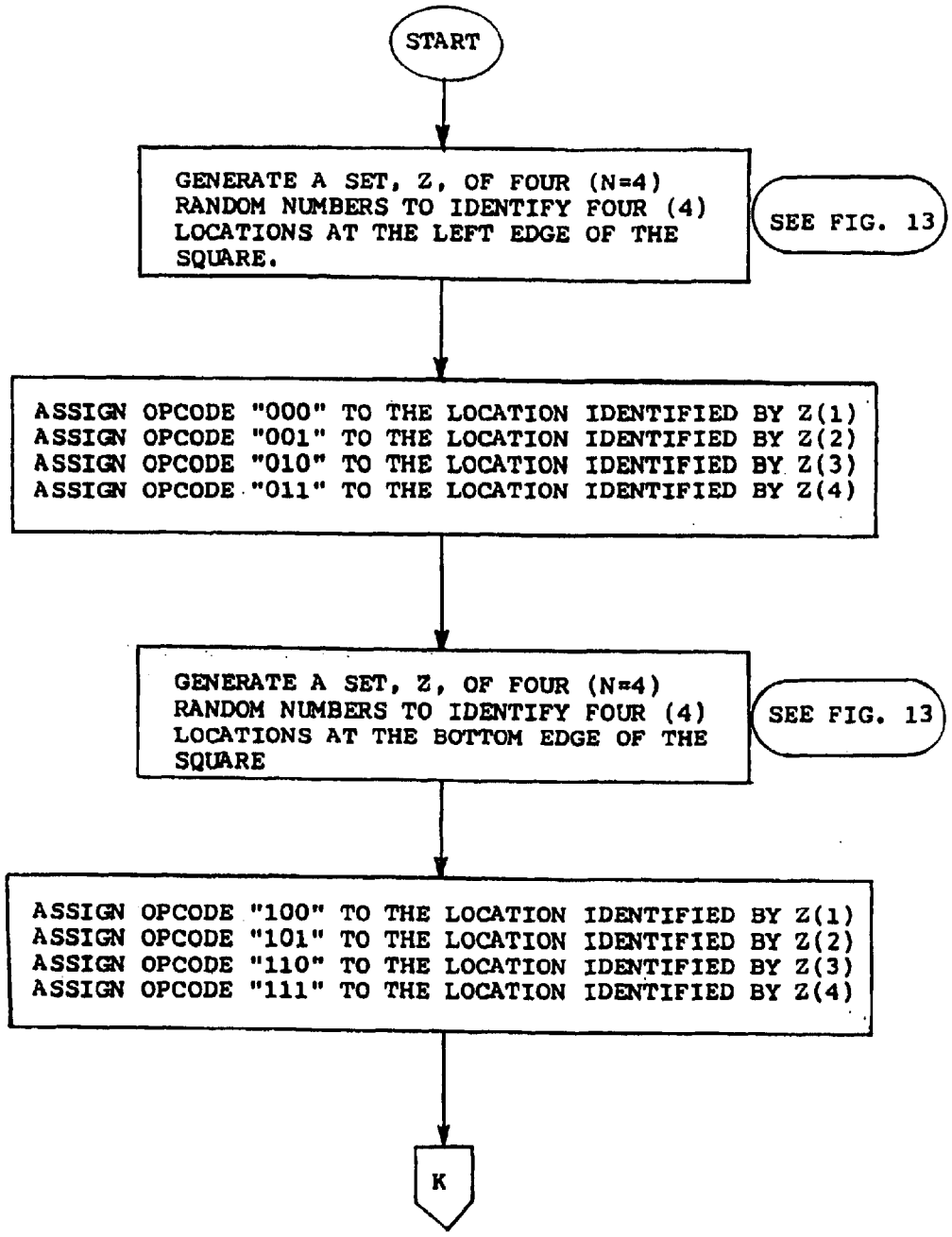
FIGS. 14 and 15 illustrate a flow diagram of the logic steps utilized by the present invention to generate and assign random operating codes.
Figure 15:
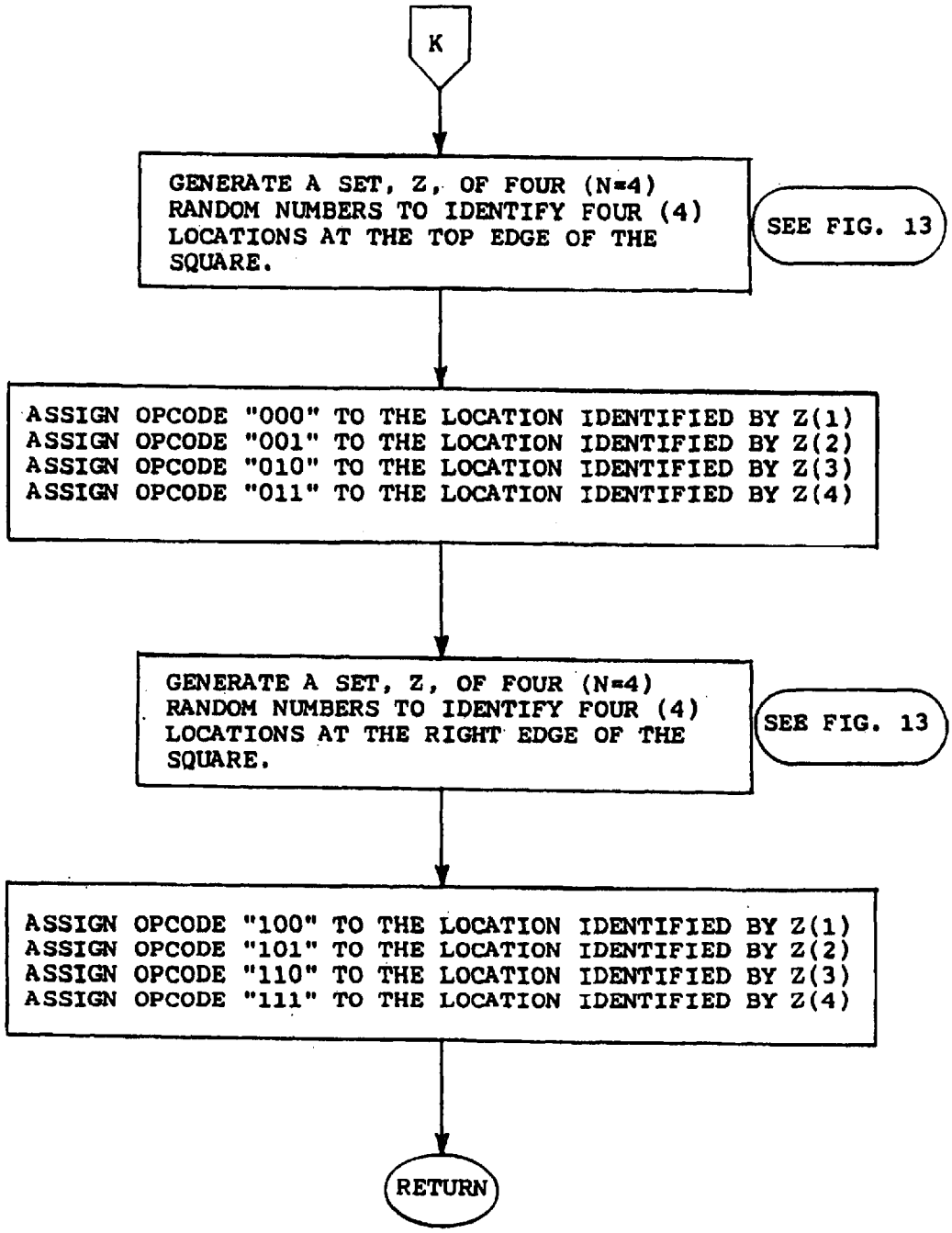
Figure 16:
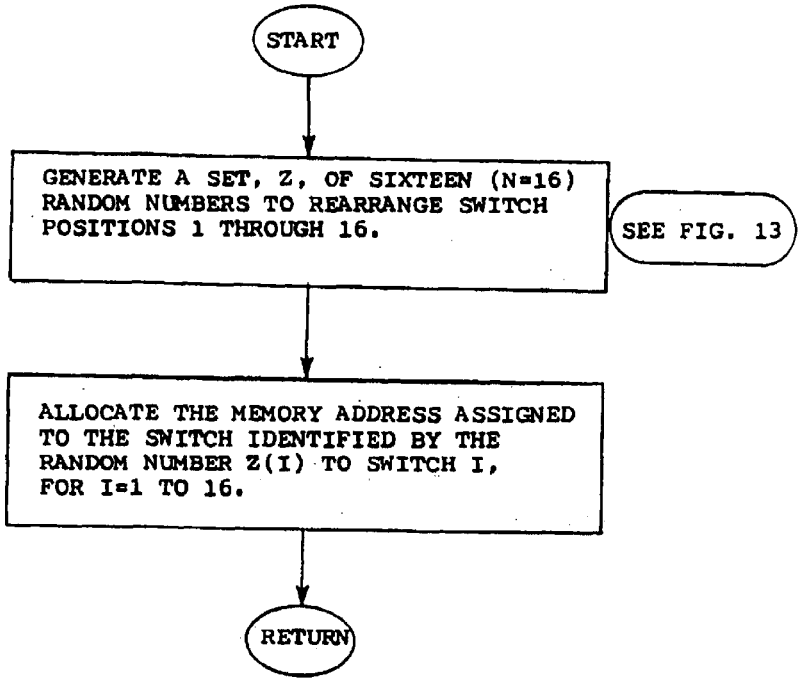
FIG. 16 illustrates a flow diagram of the logic steps utilized by the present invention to randomly rearrange switch positions.
Figure 17:
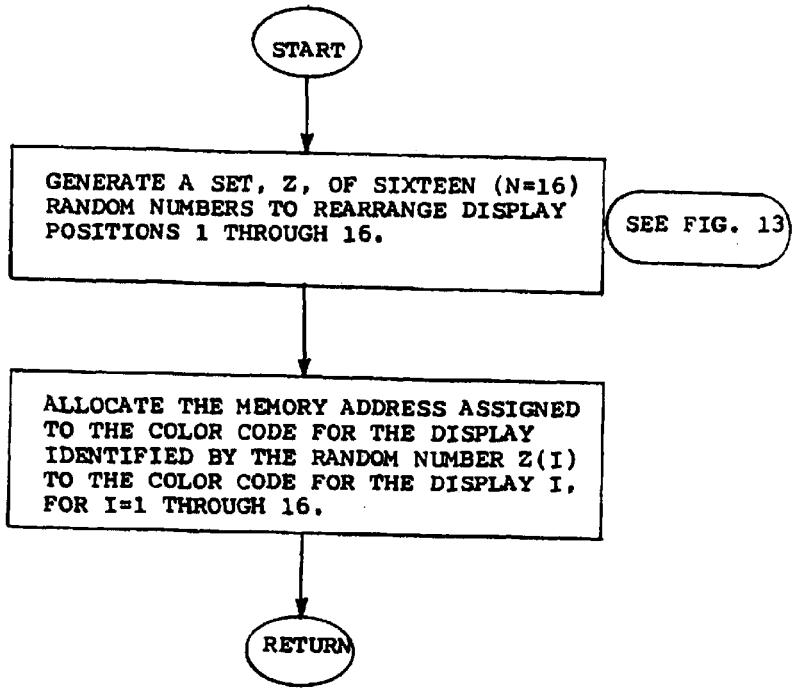
FIG. 17 illustrates a flow diagram of the logic steps utilized by the present invention to randomly rearrange display positions.

Referring now to the drawings where the illustrations are for the purpose of describing the preferred embodiment of the invention and are not intended to limit the invention hereto, FIG. 3 is a front [planview] *perspective view* of an electronic [RAINBOWX] device 10 is comprised of a [case] *housing* 12 having a face 14 and carrying an array of individually operable multi-color lighted switches 22 which [defining] *define* a field of play. In a specific embodiment illustrated in FIG. 3, an arrays of four rows and four columns defines a field of play having sixteen individually operable multi-color lighted switches which may be referred to as 21-1 through 22-16; each row being numbered from left to right and from top to bottom.

A block diagram of the control circuitry for this [RAINBOWX] device 10 is illustrated in FIG. 4. This control circuitry includes a central processing unit 30 having a control program memory 32 associated therewith, a read only memory (ROM) 32, a random access memory (RAM) 34, a plurality of interface and coding devices 38, 40, 42 and a plurality of memory decoder drivers 36, 44, 48. The interface and coding devices 38, 40, 42 are used as an input interface between the multi-color lighted switches and control push buttons with the central processing unit 30. As such, interface and coding device 38 is associated with level selector switch 18; interface and coding device 40 is associated with sixteen (16) multi-color lighted switches; and interface and coding device 42 is associated with the new game selector switch. In contrast, the memory decoder device 36 is used as an output interface between the central processing unit 30 and the multi-color displays. A common address and control bus 52, and a separate common data bus 50 are used to interconnect the central processing unit 30 with the interface and coding devices 30, 40, 42, the memory decoder drivers 36, 44, 48, the read only memory (ROM) 32, and the random access memory (RAM) 34.

The central processing unit 30 controls the flow of all information throughout the entire system under the direction of the control program. The control program resides in the read only memory (ROM) 32.

A plurality o dry cell batteries 62 are positioned in the housing beneath the switches, these batteries 62 providing power for the central processing unit 30 as well as the multi-color displays 24. An on/off toggle switch 16 is provided to control the operational state of the device and the connection of the internal battery supply 62 to the electric circuitry. A new game selector, push button switch 20, permits the user to terminate the current game and initiate the play of a new one. A level selector rotary switch 18 permits the user to select one of four levels of difficult playable by the device. A loudspeaker 46 is positioned in the middle portion of the housing and perforations 26 are provided to permit sounds from the loudspeaker 46 to issue from the housing.

With respect to the operation of the device, the logic steps utilized are illustrated in flow diagram form in FIGS. 5 through 12, which interconnect with each other at the places shown in the various figures. Even though specific reference will not be made to this diagram in the following description of the operation of the device, periodic reference to this diagram may prove to be helpfull to the reader hereof.

Figure 1:
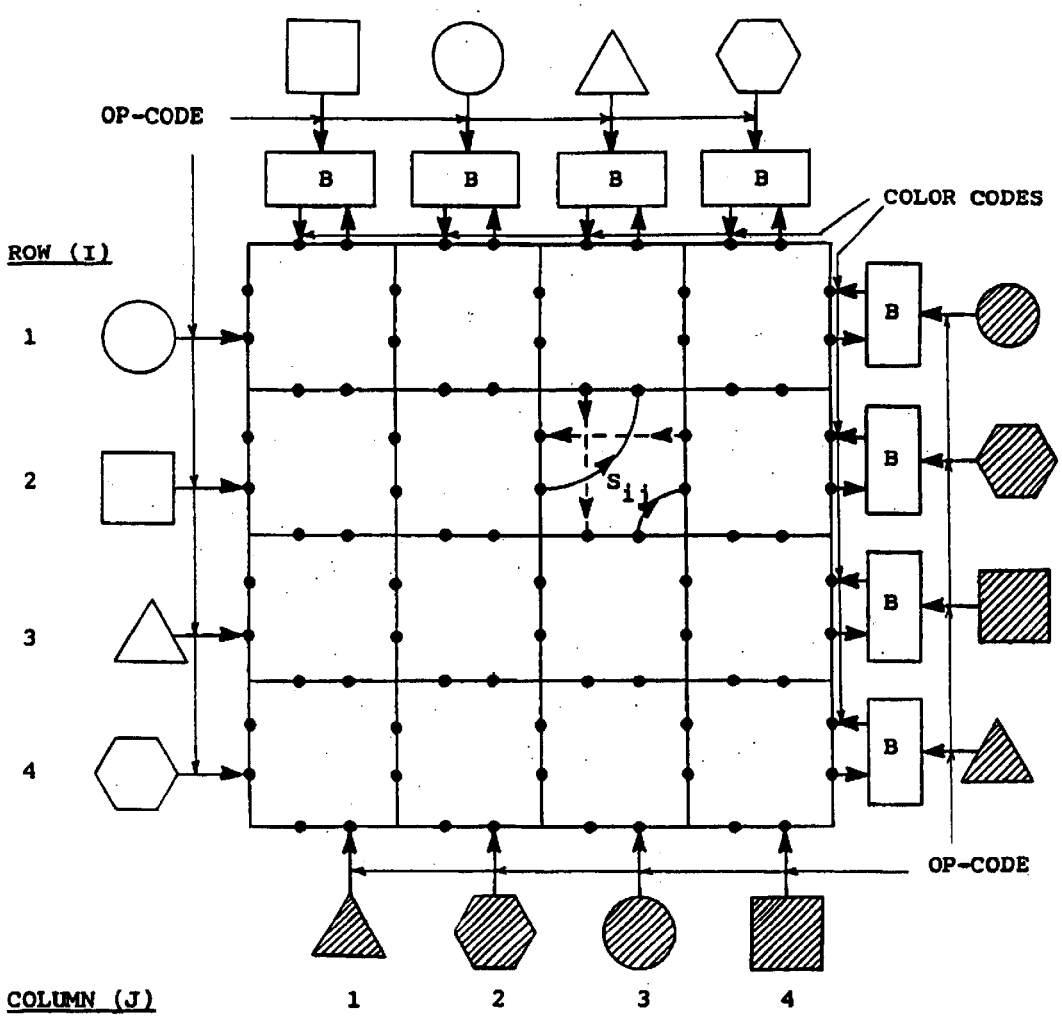
FIG. 1 is a geometric representation of the preferred embodiment for the [RAINBOWX] logic game.
Figure 2A:
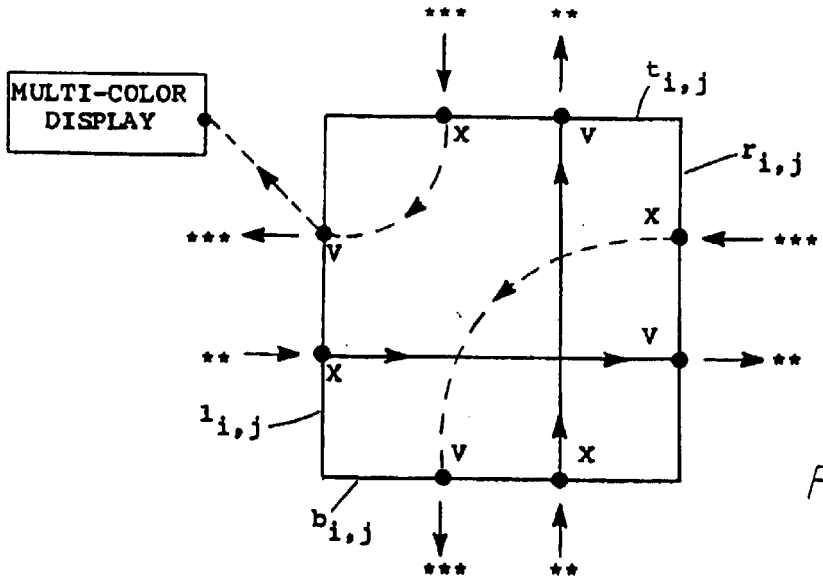
FIGS. 2a and 2b depict geometric representations of the routing square, indicating the various routes within the square, for each of two states of the associated switch.
Figure 2B:
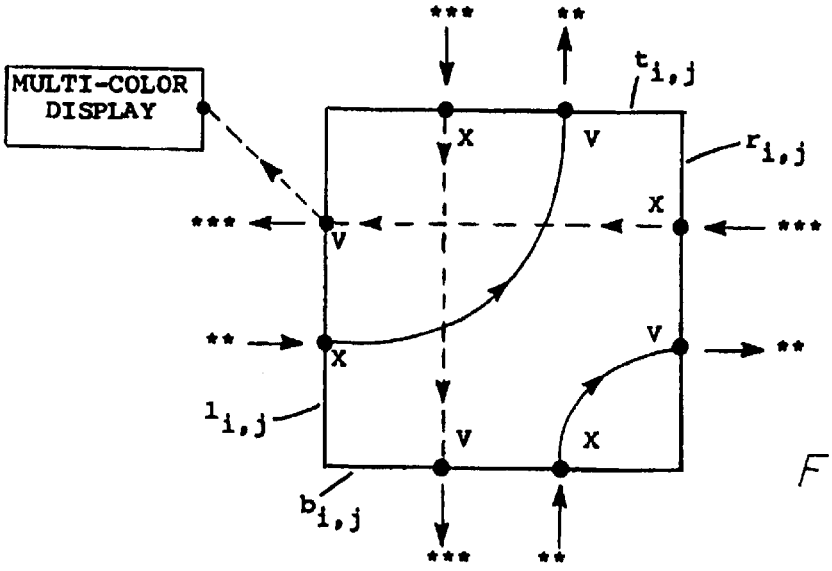

Referring again to FIG. 4, in order to operate the device, the player moves the off-on switch 16 from the "off" position to the "on" position which causes power to be supplied to all terminals of the device 10 from either a battery 62 or some external power source and which causes a pulse generator 64 to generate a reset pulse. This pulse is applied to the central processing unit 30 and causes the central processing unit 30 to clear any data remaining in the RAM 34 and in the memory decoder drivers 36, 44 over the common data bus 50. The pulse also causes the central processing unit 30 to generate four (4) sets of random numbers. Each of said sets of random numbers comprises four (4) distinct decimal numbers from 1 to 4, and each of said distinct decimal number s corresponds to a location (1 to 4) at an edge of the geometric square described in FIG. 1 such that the first set of random numbers corresponds to the four locations at the left edge of the square, the second set of random numbers corresponds to the four locations at the bottom edge of the square, the third set of random numbers corresponds to the four locations at the top edge of the square and the fourth set of random numbers corresponds to the four locations at the right edge of the square. The central processing unit 30 also assigns the four binary numbers 000, 001, 101 and 011 to the four locations at the left edge of the square such that the binary number 000 is assigned to the location identified by the first decimal number of the first random set, the binary number 001 is assigned to the location identified by the second decimal number of the first random set, etc. Similarly, the four binary number 100, 101, 110 and 111 are assigned to the four locations at the bottom edge of the square, the four binary numbers 000, 001, 010 and 011 are assigned to the four locations at the top edge of the square, and the four binary numbers 100, 101, 110 and 111 are assigned to the four locations at the right edge of the square. *These binary numbers are further assigned to the remaining playing positions on the playfield by virtue of the routing square configuration. As shown in FIGS. 2a and 2b, respective to each playing position are four binary numbers assigned to top, right, bottom, and left playing positions.* Next, the level selector switch 18 through the interface and coding device 38 accesses the central processing unit 30 over the address and control bus 52 and a signal is transmitted thereto via the data bus 50. The central processing unit 30 identifies the level of difficulty, i.e., the position of the level selector switch 18, and through its control program 32 rearranges switch positions 21-1 through 22-16 and/or multi-color color display positions 24-1 through 24-16, such that if the level selector switch 18 is set to either "2" or "4", the central processing unit 30 generates a set of random numbers which comprises sixteen (16) distinct decimal numbers from 1 to 16, and each of said decimal numbers corresponds to each of the actual positions of switches 22-1 through 22-16, such that if the player activates the switch located at position 22-x, it will appear to the device that the switch located at position 22-y has been activated wherein y is the random decimal number which corresponds to the actual switch position x. Similarly, if the level selector switch 18 is set to either "3" or "4", the central processing unit 30 generates a different set of random numbers which also comprises sixteen (16) distinct decimal numbers from 1 to 16, and each of those decimal numbers corresponds to each of the actual positions of multi-color displays 24-1 through 24-16, such that if the control program 32 determines that the multi-color display located at position 24-z should be activated, the central processing unit 30 will activate the multi-color display located at position 24-w, and it will appear to the player that the display located at position 24-w has been activated wherein w is the random decimal number which corresponds to *the* actual display position z. At any time during the course of a game, the player may change the position of the level selector switch 18, however, only two (2) sets of random numbers are generated by the central processing unit 30 for each single game (one set for apparent switch positions and a second set for apparent display positions). At all times during the course of a single game, the central processing unit 30 stores the current position of the level selector switch 18 in RAM 34, identifies any new position of said switch, and through its control program 32 rearranges or restores the positions of switches 22-1 through 22-16 and/or rearranges or restores the positions of multi-color displays 24-1 through 24-16, as the case may be, and as fully illustrated in flow diagram form in FIG. 6.

Figure 19:
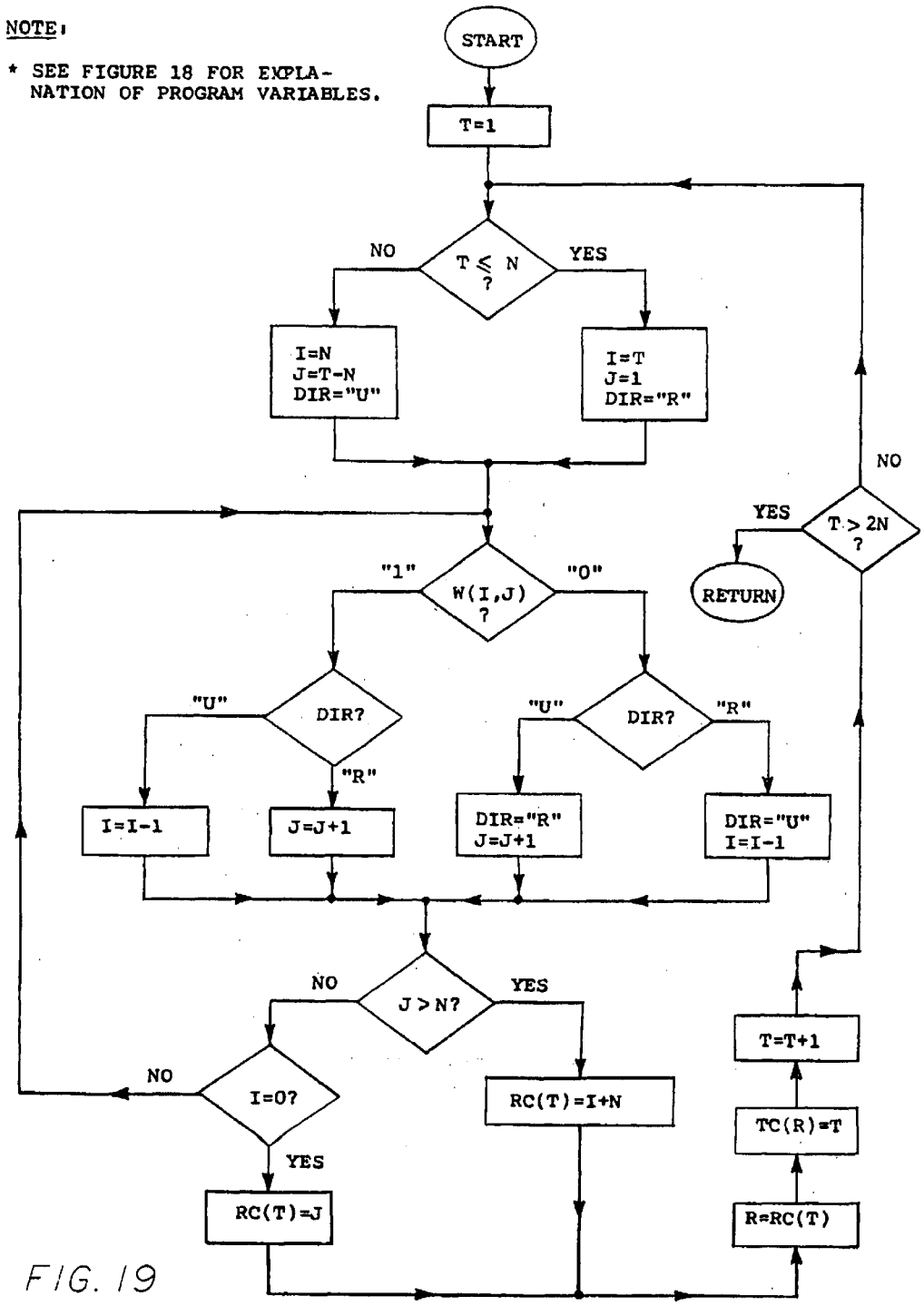
FIG. 19 is a logical flow diagram illustrating the logic steps utilized by the present invention to determine all pairs of interconnected objects.

To determine the initial status of all switches 22-1 through 22-16, the central processing unit 30 accesses each of said switches over the address and control bus 52 and interface and coding device 40 causing a signal to be transmitted thereto via the data bus 50. The central processing unit 30 identifies the status of the switch, i.e., if the switch is in the "ON" ("1") or "OFF" ("0") position. The central processing unit 30, through its control program 32, identifies the RAM memory address which corresponds to the switch and accesses this memory address over the address control bus 52. The central processing unit 30 then transfers the data on the status of the switch to said RAM memory address over the data bus 50. After the initial status of all switches are stored in RAM 34, the central processing unit 30 through its control program 32 identifies an opcode receiver "R" for each opcode transmitter "T". As illustrated in the flow diagram of FIG. 19, the control program 32 first determines if transmitter "T" is located at either the left edge or the bottom edge of the square, then it determines the location of the first switch adjacent to said transmitter "T". Starting at this location, the control program 32 traces an internal route within the square by using the status of said first switch, *or the state of the associated routing square,* to determine the location of the second switch on the route. The status of the second switch, *or the state of the second routing square,* is then used to determine the location of the third switch on the route, etc. The foregoing process continues until this internal route terminates at an opcode receiver "R" located at either the top edge or the right edge of the square. The central processing unit 30 through its control program 32 causes the locations of transmitter "T" and associated receiver "R" to be stored in RAM 34.

Figure 20:
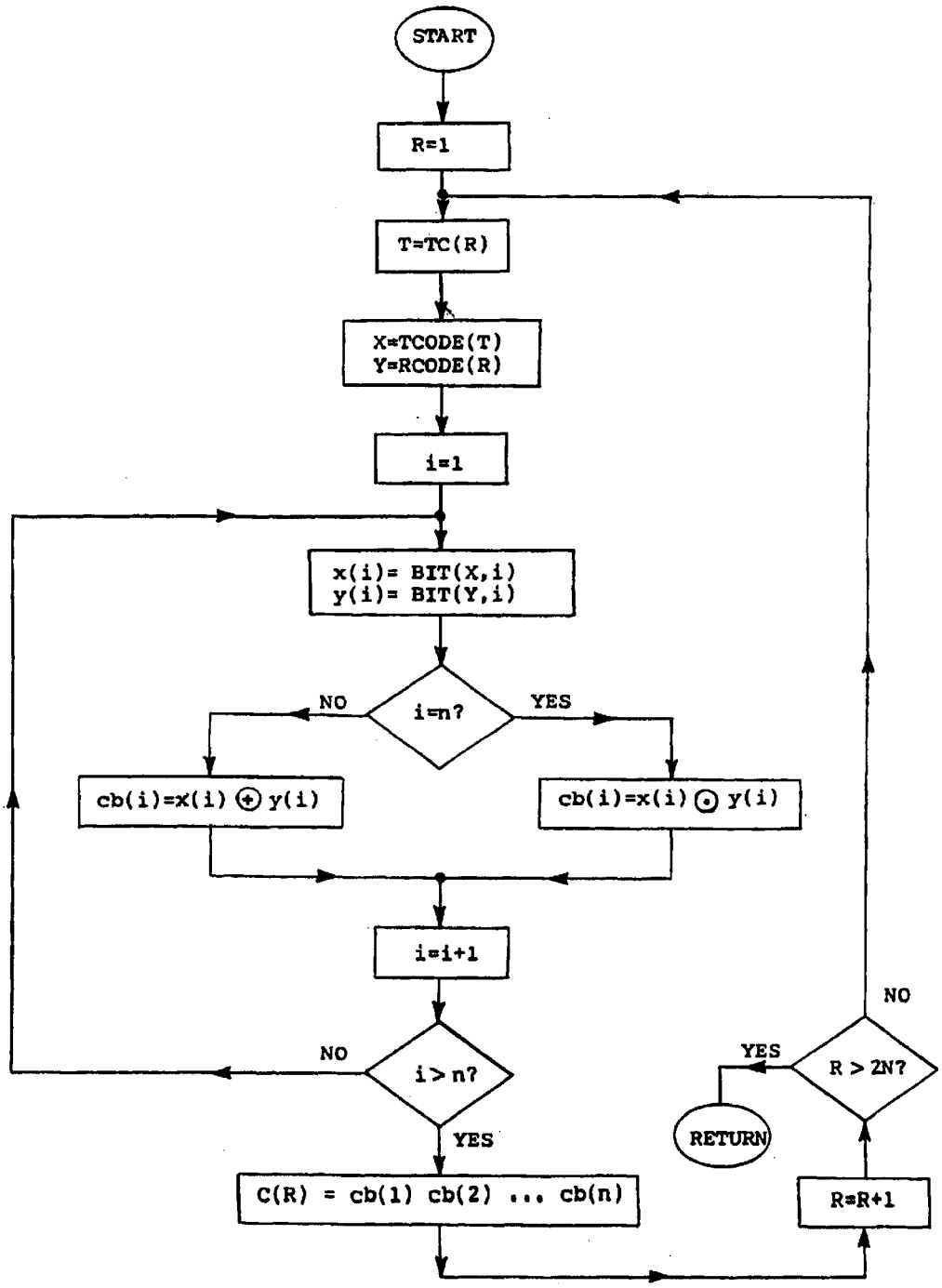
FIG. 20 is a logical flow diagram illustrating the logic steps utilized by the present invention to generate color codes at the top and right edges of the square.

After the locations of all opcode transmitters and associated opcode receivers are stored in RAM 34, the central processing unit 30, through its control program 32, generates a color code at each opcode receiver. As illustrated in the flow diagram of FIG. 20, the central processing unit 30, through its control program 32, identifies the transmitter associated with the receiver at location "1" by accessing the RAM 34 over the address and control bus 52 causing the identity of said transmitter to be transmitted to the central processing unit 30 via the data bus 50. The central processing unit 30, under the instruction of the control program 32, then accesses the RAM 34 over the address and control bus 52 to obtain the two opcodes assigned to receiver "1" and its associated transmitter. The RAM then forwards said two opcodes over the data bus 50 to the central processing unit 30. To generate the color code at receiver "1", the central processing unit *30* executes the ["INCLUSIVE OR" b] *"EXCLUSIVE NOR" B*oolean function on the third (left) digit of the opcode assigned to receiver "1" and the third (left) digit of the opcode assigned to the transmitter associated with receiver "1", to compute the third (left) digit of said color code. Similarly, the first and second digits of the color code are computed from the opcodes using the "EXCLUSIVE OR" [b]*B*oolean function. The central processing unit 30 then causes said color code at receiver "1" to be stored in RAM 34. The foregoing processing continues until all eight (8) color codes at the eight (8) opcode receivers are computed and stored in RAM 34.

The central processing unit 30, through its control program 32, then identifies the locations of the multi-color displays connected to each opcode receiver and assigns the color code generated at the receiver to either the top edge or the right edge of the routing square associated with each multi-color display connected to said opcode receiver. As illustrated in the flow diagram of FIG. 21, for each receiver "R", the control program 32 first determines if the receiver "R" is located at either the top edge or the right edge of the square, then it determines the location of the first switch and multi-color display adjacent to said receiver "R". If "R" is located at the top edge of the square, the central processing unit 30, through its control program 32, assigns the color code generated at receiver "R" to the top edge of the routing square associated with the first multi-color display. Alternatively, if "R" is located at the right edge of the square, the central processing unit 30, through its [central] *control* program 32, assigns the color code generated at the receiver "R" to the top edge of the routing square associated with the first multi-color display. Starting at this location of first multi-color display, the control program 32 traces an internal route within the square by using the status of the first switch, *or the state of the associated routing square,* to determine the location of the second switch and multi-color display on the route. The status of the second switch, *or the state of the corresponding routing square,* is then used to determine the location of the third switch and multi-color display on the route, etc. The foregoing process continues until this internal route terminates at either the left edge or the bottom edge of the square. While this is occurring, the central processing unit 30 also assigns the color code generated at receiver "R" to either the top edge or the right edge of the routing square associated with each multi-color display on the route. The central processing unit 30, under the instruction of the control program 32, then causes the color codes assigned to either the top edge or the right edge of the routing square associated with each multi-color display on the route to be stored in RAM 34. The foregoing operation is employed to identify all display routes within the square and to assign two color codes to each multi-color display.

The central processing unit 30, through its control program 32, then selects a color code to activate each of the sixteen (16) multi-color displays. As illustrated in the flow diagram of FIG. 22, for the multi-color display associated with the routing square located at row I and column J of the geometric square described in FIG. 1, the control program uses the status of the switch, *or the state of the associated routing square,* also located at row I and column J, to determine the color to be forwarded to this multi-color display, such that if the status of said switch, *or the state of the associated routing square,* is "0", then the color code assigned to the top edge of the routing square is forwarded to the multi-color display, and if the status of said switch, *or the state of the associated routing square,* is "1", then the color code assigned to the right edge of the routing square is forwarded to the multi-color display. The central processing unit 30 also causes the selected color code to be stored in RAM 34. The foregoing process continues unit all sixteen (16) selected color codes are store in RAM.

Figure 21:
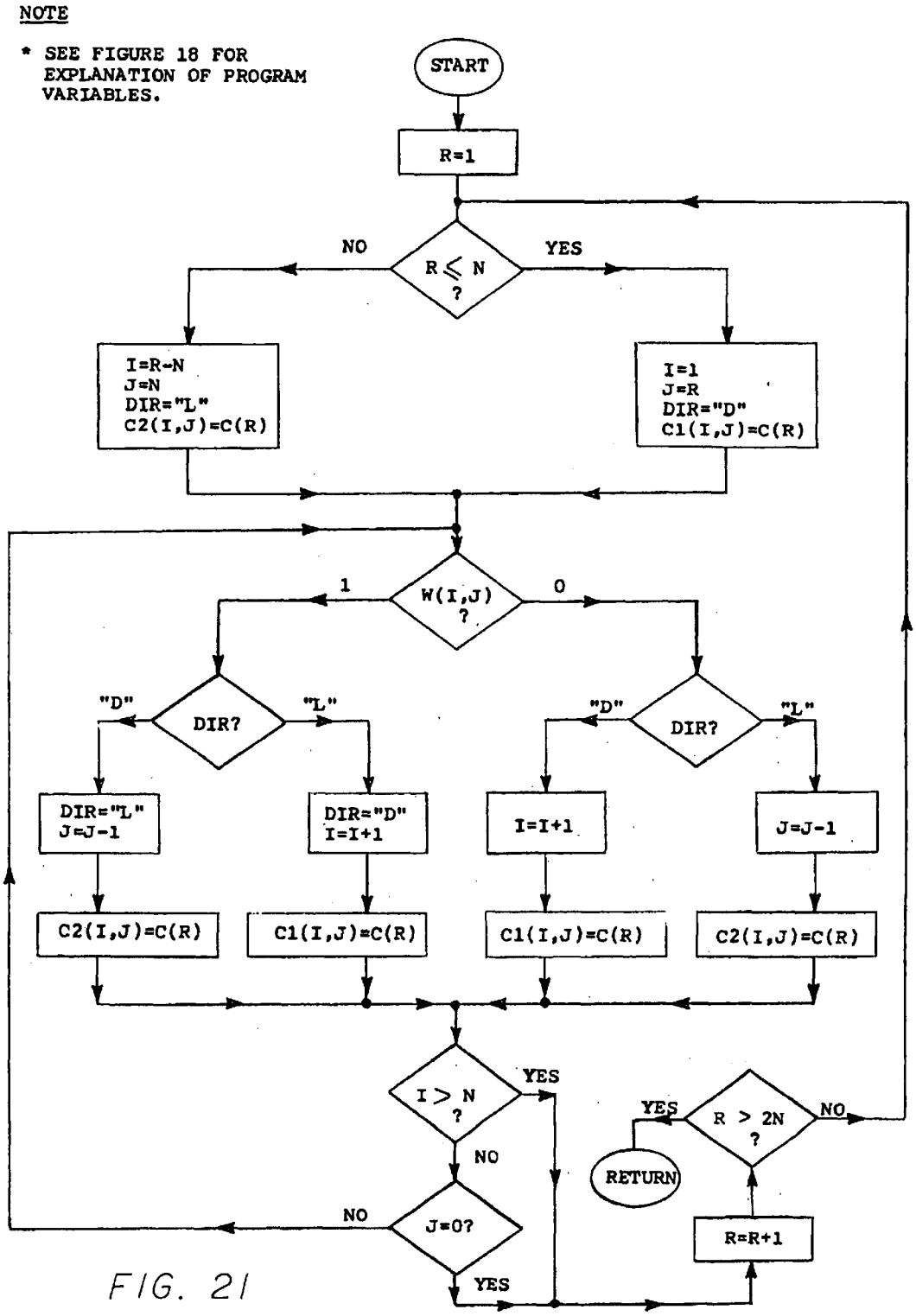
FIGS. 21 and 22 illustrate flow diagrams of the logic steps utilized by the present invention to identify all display routes. within the square and to determine the color to be displayed at each multi-color display.
Figure 22:
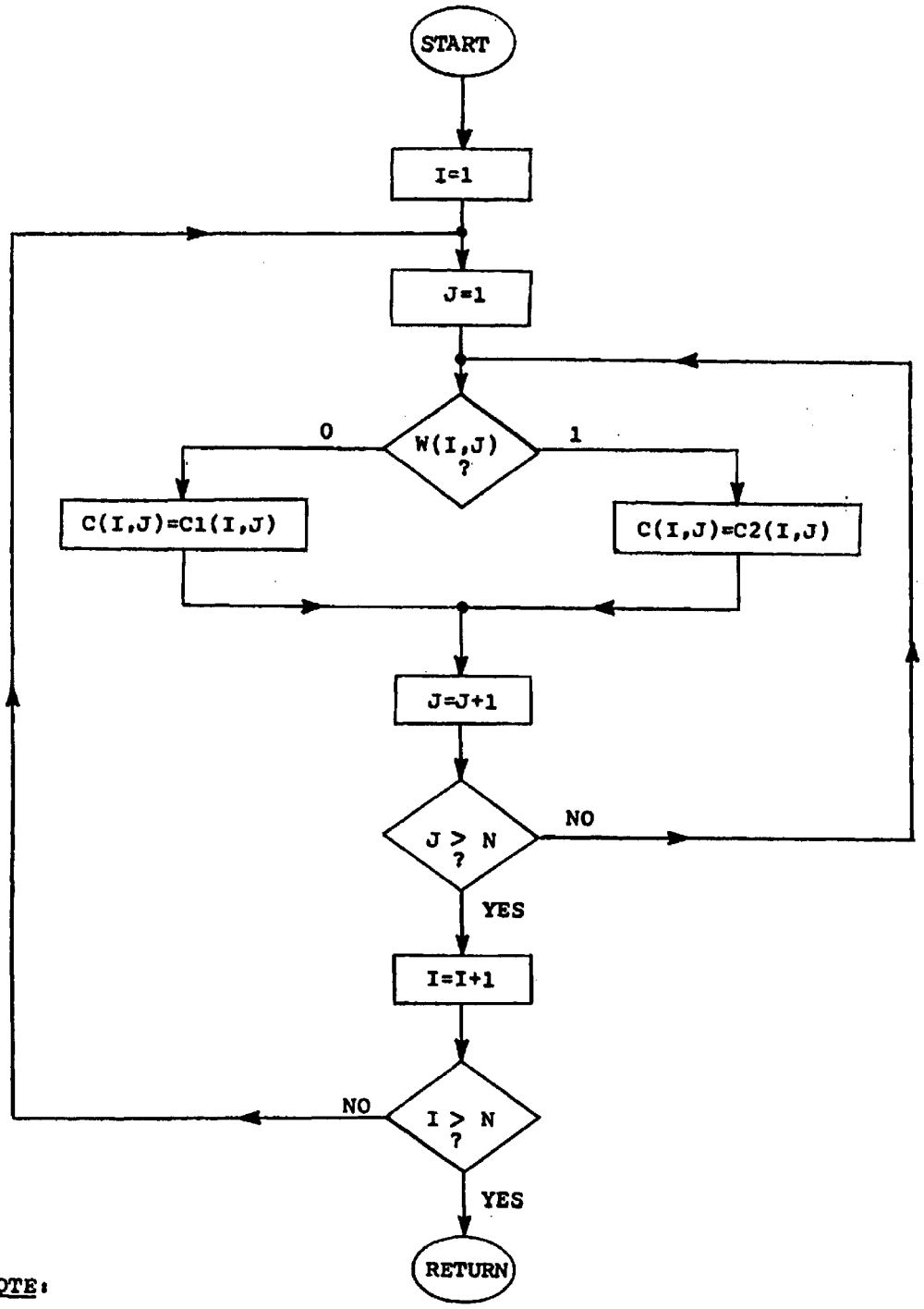

*It should be noted that the aforestated description of an algorithm to assign color codes to playing positions (as shown in FIGS. 21 & 22) is provided only as an example, and is not intended to limit the invention herein. As would be obvious to a person skilled in the art, there is almost unlimited number of ways to assign the generated color codes to playing positions. For example, such assignment could be based on a fixed relationship between generated color codes and playing positions. It should also be noted that a solution to a game, where the objective of the game is to provide the same color or image at all playing positions, is independent of how color codes are assigned to playing positions.*

In order to activate the multi-color displays, the central processing unit 30, through its control program 32, identifies the selected color code addresses in RAM 34, and over the address and control bus 52 accesses said RAM addresses. The RAM 34, in turn, transfers color codes data over the data bus 50 to the memory decoder driver 36 via the central processing unit 30. The memory decoder driver 36, in turn, activates each of the sixteen (16) multi-color displays such that if the first (left) digit of the selected color code equals to "1", then if the second and third digits equal to "00", then the display will indicate "RED"; if the second and third digits equal to "01", then the display will indicate "YELLOW"; if the second and third digits equal to "10", then the display will indicate "GREEN" and if the second and third digits equal to "11", then the display will indicate "BLUE". Alternatively, if said first digit equals to "0", then the display will be "DARK," *and the color visible to the player is the external color reflected from the surface of the display.*

After the multi-color displays have been updated in accordance with the initial positions of the switches, the determination is made by the central processing unit in a decision block SAME COLOR? as to whether or not all multi-color displays indicate the same color. If the determination is NO, the central processing unit 30, through its control program, transfers the distinct tone sequences of the ready beep to the memory decoder 44 over the data bus 50. The memory decoder and associated audio control circuits 44, in turn, causes said tone sequences to be generated through the loud speaker 46. The device 10 is now ready for the player to activate one or more switches in order to solve the puzzle.

If the player activates any of the switches 22-1 through 22-16, the interface and coding device 40 accesses the central processing unit 30 over the address and control bus 52 and a signal is transmitted thereto via the data bus 50. The central processing unit identifies the position of the activated switch 22, and the status of said switch, i.e., if the switch is in the "ON" ("1") or "OFF" ("0") position. The central processing unit 30, through its control program 32, then identifies the associated RAM memory address over the address control bus 52, and causes the data on the status of said switch to be transferred to the RAM memory address over the data bus 50. The central processing unit 30, under the instruction of the control program 32, also scans all remaining switches 22, as well as the level selector switch, and causes the status of said switches to be transferred to the RAM 34 over the data bus 50.

After the detection of any changes in switch positions, the central processing unit 30, through its control program 32, transfers a signal to the memory decoder 44, over the data bus 50, causing said memory decoder and associated audio control circuits 44, to generate a high pitch beep tone through the loud speaker 46. The logic control then proceeds to perform the functions of identifying an opcode receiver "R" for opcode transmitter "T", generating a color code at each opcode receiver, identifying the locations of the multi-color displays connected to each opcode receiver, assigning two color codes to each routing square, selecting a color code to update each of the sixteen (16) multi-color displays and transfering color codes data, over the data bus 50, to the memory decoder drivers 36 to update said multi-color displays.

After these functions have been performed, the determination is again made by the central processing unit 30 in the decision block SAME COLOR? as to whether or not all multi-color displays indicate the same color. If the determination is still NO, the player may continue to activate the switches causing the central processing unit, under the instruction of the control program, to repeat the foregoing operation.

Upon the determination that the same color is indicated at all sixteen (16) displays, the central processing unit 30, through its control program 32, identities the color being displayed, selects a melody from a plurality of melodies associated with said color and stored in the control program memory 32, and sets the display code to the color code of the color being displayed. The central processing unit 30 also accesses the memory decoder driver 48 over the address and control bus 52 and transmits a signal over the data bus to activate the flashing control circuit 56 causing all multi-color displays to flash their indications. The central processing unit 30, through its internal timer or oscillator circuit then initializes a flashing timer to control the flashing duration of the multi-color displays.

Upon the expiration of the flashing time, the central processing unit 30 deactivates the flashing control circuits 56, and initializes its internal tone generator with the distinct tone sequences of the selected melody. The central processing unit, under the instruction of the control program, transfers said distinct tone sequences to the memory decoder 44 over the data bus 50. The memory decoder and associated audio control circuits 44, in turn, causes the distinct tone sequences of the selected melody to be generated through the loud speaker 46. While this is occurring, the central processing unit 30 also generates a sequence of random singular color displays, which are synchronized with the tones generated through the loud speaker 46, as fully illustrated in flow diagram form in FIG. 9. The central processing unit, through its control program, first determines the type of the next tone to be generated, then it searches its control program memory 32, to determine the number of multi-color displays associated with that tone. The random locations of said multi-color displays are then transmitted by the central processing unit and the color codes associated with these displays are set to the display code. The color codes for all remaining multi-color display locations are set to "000". The central processing unit then waits for an internal signal before updating the multi-color displays. The foregoing operation continues for each tone generated until a determination is made, by the central processing unit 30, in the decision block DONE MELODY? that the tone sequences of the selected melody have been completed.

Upon the completion of the tone sequences of the selected melody, the logic control flow disables the tone generator then proceeds to a decision block where the determination is made whether or not all color flags have been set to a "1". If the determination is NO, the control path proceeds through the marker D of FIG. 9 to the reference marker D of FIG. 5, so that the player may continue solving the remaining color(s) of the game. If the determination is YES, i.e., all four (4) colors have been solved, the central processing unit 30, through its control program 32, selects and end of game melody from a plurality of melodies stored in the control program memory 32, accesses the memory decoder driver 48 over the address control bus 52 and transmits a signal over the data bus to activate the flashing control circuits 56 causing all multi-color displays to flash their indications. The central processing unit 30, through its internal timer or oscillator circuit, then initializes a flashing timer to control the flashing duration of the multi-color displays. Within said flashing duration, the central processing unit 30 selects one of the four (4) color codes "100", "101", "110" and 111", at random, and assigns it to all sixteen (16) multi-color displays. The central processing unit then waits for an internal signal before updating the multi-color displays. The foregoing process of randomly varying the color of the multi-color flashing displays continues until the expiration of the flashing timer.

Upon the expiration of the flashing time, the central processing unit deactivates the flashing control circuits 56, and initializes the internal tone generator with the distinct tone sequences of the selected end of game melody. The central processing unit 30, under the instruction of the control program 322, transfers said distinct tone sequences to the memory decoder 44 over the data bus 50. The memory decoder and associated audio control circuits 44, in turn, causes the distinct tone sequences of the selected melody to be generated through the loud speaker 46. While this is occurring, the central processing unit 30 also generates a sequence of random multi-color displays which are synchronized with the tones generated through the loud speaker 46 as fully illustrated in flow diagram form in FIGS. 10 and 11.

Upon the completion of the tone sequences of the selected melody, the central processing unit disables the tone generator, sets all color flags to "0", sets the color codes of all sixteen (16) multi-color displays to "000", and sets all multicolor displays to "DARK". The logic flow then proceeds through the marker J of FIG. 11 and the reference marker J of FIG. 12 to the decision block NEW GAME? to determine whether or not the new game switch 20 has been activated. If the player activates the new game switch 20, the interface coding device 42 accesses the central processing unit over the address and control bus 52 and a signal is transmitted thereto via the data bus 50 causing the new game flag to be set to "1". The central processing unit then causes the pule generator 64 to generate a reset pulse which, when applied to the central processing unit, causes the logic control flow to proceed to the reference marker B of FIG. 5. The reset pulse also cases the central processing unit to clear all data in RAM 34 and in the memory decoder driver 36, 44, 48 over the common data bus 50. The central processing unit also resets all flags and program variables. The logic control then proceeds to generate four (4) new sets of random operating codes and to repeat the functions illustrated in FIG. 5 through FIG. 12.

At any time during the progress of a game, the player may terminate the current game and initiate a new one by two consecutive activations of the new game switch 20. Upon the first activation of the new game switch 20, the central processing unit 30, interrupts its current processing and initializes a timer which establishes a time period within which the player must reactivates the new game switch 20 in order to initiate a new game. If the player fails to reactivate the new game switch within the established time, the logic control flow returns to the point where it was interrupted to continue the current game. Upon the second activation of the new game switch 20, within the established time, the central processing unit 30 causes the pule generator 64 to generate a reset pulse and the logic control flow then proceeds to the reference marker B of FIG. 5 to initiate a new game.

*It should be noted that while the above description of the operation of the preferred embodiment employs bi-stable switches to control the routing squares, a routing square could be activated by a keypad switch, i.e., momentary switch, to toggle it between its two states indicated in FIGS. 2a & 2b. In such a case, the states of a routing square, rather than the states of the bi-stable switch, are used to provide the various functions described for the preferred embodiment.*

*It should also be noted that the number of colors or images playable by a device is a design choice. The color codes in the 4×4 embodiment could be assigned to any pre-defined number of visual indications, i.e., to any pre-defined images or colors, including the color reflected from the surface of a display when it is dark. For the 4×4 embodiment, a person with ordinary skills in the art could employ such assignment to operate the device with 2, 3, 4, or 5 colors or images. Similarly, for the 8×8 embodiment, the number of colors or images could be 2 to 9.*

As will be understood by those skilled in the art, many different programs may be utilized to implement the flow charts disclosed in FIG. 5 through FIG. 22. Obviously these programs will vary from one another in some degree. However, it is well within the skill of the computer programmer to provide particular programs for implementing each of the steps of the flow charts disclosed herein. It is also to be understood that the foregoing detailed description has been given for clearness of understanding only and is intended to be exemplary of the invention while not limiting the invention to the exact embodiment shown. Obviously certain modifications, variations and improvements will occur to those skilled in the art upon reading the foregoing. It is therefore to be understood that all such modifications, variations and improvements have been deleted herein for the sake of conciseness and readability but are properly within the scope and spirit of the following claims.

MATHEMATICAL DESCRIPTION OF THE LOGIC PROBLEM

[A RAINBOWX LOGIC PROBLEM]

Let the logic game herein be represented by a geometric square, and let the surface of the square be subdivided into $N^2$ multi-color sub-squares, where N+*1* denotes the number of colors which may be displayed on any sub-square.

Definition Of Operating And Color Codes

Let D denotes a binary operating code of length n, where n=1n N+1.

Then

D is a set of all possible values of a binary code of length n.

$d_i$; i=1, . . . ,2N, is the ith code of D.

Let $m_{i,j}$; i,j=1, . . . ,2N, denotes the pair ($d_i$, $d_j$).

M be a set of all possible pairs, $m_{i,j}$, of the operating binary code D.

C denotes a binary color code of length n.

Then

C is a set of all possible values of a binary code of length n.

$C_k$; k=1, . . . ,2N, is the kth code of C.

Let $M_k$ be a subset of M, of all pairs ($d_i$, $d_j$) which satisfy; B ($d_i$, $d_j$)=$C_k$, where B is an appropriate [b]*B*oolean function.

Then the color assignment on the surface of the square is defined as follows:

(i) The nth digit of $c_k$ is used to turn a display "ON" and "OFF".

(ii) The first (n−1) digits of $c_k$ are used to select one out of N colors that may be displayed on the square.

The color assignment for [the EXCLUSIVE OR boolean function, and for] N=4& N=8, are shown for FIGS. 23 and 24 respectively.

Definition Of Routing Square

The Routing Square, $S_{i,j}$, shown in FIG. 2, is defined as a quad routing device which is activated by a two-position (binary) switch, $W_{i,j}$. A total of $N^{22}$ Routing Squares are provided in the logic game herein, and are arranged in a two-dimensional geometric layout. The Routing Square, $S_{i,j}$, is then described as follows:

Let $S_{i,j}$ denotes routing square (i, j).

$W_{i,j}$ denotes binary switch (i, j).

$t_{i,j}$ denotes the TOP edge of $S_{i,j}$.

$l_{i,j}$ denotes the LEFT edge of $S_{i,j}$.

$r_{i,j}$ denotes the RIGHT edge of $S_{i,j}$.

$b_{i,j}$ denotes the BOTTOM edge of $S_{i,j}$.

Two nodes are connected to each edge of the square, a transmitting node (X), and a receiving node (V). The Routing Square functions as follows:

If $W_{i,j}$="1", then:

$b_{i,j}$(X) CONNECTS TO $t_{i,j}$(V).

$l_{i,j}$(X) CONNECTS TO $r_{i,j}$(V).

$r_{i,j}$(X) CONNECTS TO $b_{i,j}$(V).

$t_{i,j}$(X) CONNECTS TO $l_{i,j}$(V).

If $W_{i,j}$="0", then:

$b_{i,j}$(X) CONNECTS TO $r_{i,j}$(V).

$l_{i,j}$(X) CONNECTS TO $t_{i,j}$(V).

$r_{i,j}$(X) CONNECTS TO $l_{i,j}$(V).

$t_{i,j}$(X) CONNECTS TO $b_{i,j}$(V).

Definition Of A [Rainbowx] Logic Game

Having defined the operating & color codes, and the Routing Square, the logic game herein is described as follows:

As stated, the logic game is represented by a geometric square subdivided into $N^2$ multi-color sub-squares.

Let

T denotes the TOP edge of the Square.

R denotes the RIGHT edge of the Square.

L denotes the LEFT edge of the Square.

B denotes the BOTTOM edge of the Square.

Then for a dimension "N", each edge is divided into "N" sectors as follows:

Let $t_{1,j}$; j=1, . . . , N, denote TOP sectors.

$r_{i,N}$; i=1, . . . , N, denote RIGHT sectors.

$l_{i,1}$; i=1, . . . , N, denote LEFT sectors.

$b_{N,j}$; j=1, . . . , N, denote BOTTOM sectors.

$X_i$; i=1, . . . , 2N, denote Operating Code transmitters.

$CG_j$; j=1, . . . , 2N, denote Color Code generators.

$CD_{i,j}$; i,j=1, . . . , N, denote Color Code disorders.

The Operating Code transmitters, $X_i$, are connected to the left and bottom edges of the Square, and the Color Code generators, $CG_j$, are connected to the top and right edges of the Square, as follows:

$X_i$; i=1, . . . , N, are connected to $l_{i,1}$(X); i=1, . . . , N.

$X_i$; i=N+1, . . . , 2N, are connected to $b_{N,m}$(X); j=1, . . . , N.

$CG_j$; j=1, . . . , N, are connected to $t_{1,j}$(V); j=1, . . . , N.

$CG_j$; j=N+1, . . . , 2N, are connected to $r_{i,N}$(V); i=1, . . . , N.

The Color Chart decoders, $CD_{i,j}$, are connected to $S_{i,j}$ as follows:

For i, j=1, . . . , N:

If $W_{ij}$="1" then $CD_{ij}$ is connected to $t_{ij}$(X).

If $W_{i,j}$="0" then $CD_{i,j}$ is connected to $r_{i,j}$(X).

Having described the logic game herein, the logic problem is defined as follows:

1. For EACH game, assign the Operating Codes, $d_i$&$d_j$, i,j=1, . . . , 2N, to $X_i$; i=1, . . . , 2N, and $CG_j$; j=1, . . . , 2N, as follows:

$d_i$; i=1, . . . , N, are RANDOMLY assigned to $X_i$; i=i, . . . , N.

$d_j$; j=1, . . . , N, are RANDOMLY assigned to $CG_j$; j=1, . . . , N.

Similarly, $d_i$; i=N+1, . . . , 2N, are RANDOMLY assigned to $X_i$; i=N+1, . . . , 2N.

$d_j$; j=N+1, . . . , 2N, are RANDOMLY assigned to $CG_j$; j=N+1, . . . , 2N.

2. The Operating Codes, $d_i$ (i=1, . . . , 2N), are then transmitted from $X_i$ to $CG_j$(i,j=1, . . . , 2N), via the Routing Squares. The actual route for each code, $d_i$, is dependent on the positions of the binary switches, $W_{i,j}$ (i,j=1, . . . , N).

3. When the Operating Codes, $d_i$ (i=1, . . . , 2N), are received by the Color Code generators, $CG_j$ (j=1, . . . , 2N), they are matched with Operating Codes, $d_j$ (j=1, . . . , 2N), which were assigned to $CG_j$; (j=1, . . . ,2N), and the operating Code pairs, $m_{i,j}$ (i,j=1, . . . , 2N), are then determined.

4. The Color Codes, $C_j$ (j=1, . . . , 2N), are then generated, by the Boolean Function "B", from $m_{i,j}$ (i,j=1, . . . , 2N).

5. The Color Codes, $C_j$ (j=1, . . . , 2N), are transmitted from $CG_j$ (j=1, . . . , 2N) and received by Color Code decoders, $CD_{i,j}$ (i,j=1, . . . , N), via the Routing Squares, where they are decoded and displayed on the multi-color sub-squares. The actual color displayed at each sub-square is dependent on the position of the binary switches, $W_{i,j}$ (i,j=1, . . . , N).

6. The object of the logic game is for the player to continue to manipulate the binary switches, until all the Operating Code pairs generated belong to the same subset $M_k$. At such time, all the multi-color sub-squares will display the color corresponding to the Color Code, $c_k$.

7. By changing the positions of the binary switches, the player can continue to play the game until a different color is displayed on all sub-squares. A total of N colors can be displayed in each game, *in addition to the color reflected from the surface of the sub-squares when all the displays are "dark"*.

8. For a new game, change the assignments of $d_i$ and $d_j$ (i,j=1, . . . , 2N) to $X_i$ and $CG_j$ (i,j=1, . . . , 2N).

What is claimed and desired to be secured by letters of patent of the United States is:

[1. An electronic game device comprising:

a. a housing for the device, b. means for generating a plurality of codes hereinafter refered to as operating codes, c. plurality of entry control means, d. plurality of routing means defining a respective plurality of playing positions on the surface of said housing, each of said routing means being actuable by said entry control means to route said operating codes within the device, e. means to generate a plurality of codes, hereinafter refered to as color codes, from said plurality of operating codes, f. plurality of multi-color light emitting means, g. means to route said color codes to said light emitting means in accordance with the determination of said routing means, h. means to decode said plurality of color codes and activate said plurality of multi-color light emitting means, i. means for varying the level of difficulty of any particular game, and j. sensorially perceptible indicating means responsive to said entry control means for generating a first sensorially perceptible indication corresponding to each activation of the entry control means, a plurality of sensorially perceptible and distinct indications each of which is corresponding to each of a plurality of predetermined colors being displayed at al multi-color light emitting means and a sensorially perceptible indication corresponding to the successful completion of a game.]

[2. An electronic game device as recited in claim 1 further comprising means to flash said multi-color light emitting means.]

[3. An electronic game device as recited in claim 1 wherein said entry control means and multi-color light emitting means include a plurality of multi-color lighted switches.]

[4. An electronic game device as recited in claim 1 wherein said means to generate a plurality of color codes includes means to implement a plurality of logic boolean functions.]

[5. An electronic game device as recited in claim 1 wherein said operating codes and color codes are binary.]

[6. An electronic game device as recited in claim 1 wherein each of said plurality of light emitting means is associated with each of said playing positions.]

[7. An electronic game device as recited in claim 1 wherein said means to vary the level of difficulty of any particular game includes means for changing the apparent positions of said entry control means, the apparent positions of said multi-color light emitting means or both.]

[8. An electronic game device as recited in claim 1 wherein each of said plurality of color codes corresponds to either each of a plurality of predetermined colors or to a dark indication.]

[9. An electronic game device as recited in claim 1 further comprising means to provide a plurality of games.]

[10. An electronic game device as recited in claim 9 wherein said means to provide a plurality of games includes a microprocessor which generates sets of random operating codes of each new game.]

[11. An electronic game device as recited in claim 1 wherein each of said plurality of entry control means includes a key pad switch.]

[12. An electronic game device as recited in claim 1 wherein said sensorially perceptible indications are aural.]

[13. An electronic game device as recited in claim 12 wherein at least one of said aural outputs comprises a combination of successive tones of different frequencies.]

[14. An electronic game device as recited in claim 1 further comprising means to conserve electrical energy.]

[15. An electronic game device as recited in claim 1 wherein the shape of said housing can be any three dimensional geometric configuration and wherein said plurality of playing positions are mapped on the surface of said geometric configuration.]

[16. An electronic game device as recited in claim 1 further comprising mode means for controlling said electronic game device to operate in a predetermined number of different levels of difficulty, said controlling means comprising manually operable means for selecting each of said predetermined number of different operating difficulty levels, said difficulty levels include changing the apparent positions of said entry control means and/or changing the apparent positions of said multi-color light emitting means.]

[17. An electronic game device as recited in claim 1 including a microprocessor which comprises:

a. programming means to control the progress of the game, b. programming means to generate said sets of operating codes, c. programming means to monitor the actuation of said entry control means, d. programming means to simulate the operation of said routing means to route said operating codes within the device, e. programming means to compute said color codes from said operating codes by executing a plurality of predetermined boolean functions, f. programming means to randomly map the actual positions of said entry control means into a respective plurality of apparent entry control means in order to vary the difficulty of the game, g. programming means to randomly map the actual positions of said multi-color light emitting means into a respective plurality of apparent multi-color light emitting means in order to further vary the the difficulty of the game, h. programming means to address each of said multi-color light emitting means to automatically route each of said color codes to its respective multi-color light emitting means in accordance with the determination of said routing means, i. programming means to control the flashing of said multi-color light emitting means, and j. programming means to generate a sequence of audio tones to produce said sensorially perceptible indications.]

[18. An electronic game device as recited in claim 17 further comprising controlling means for terminating the current game and initiating a new game, said controlling means comprising manually operable means to cause said device to reset its memory and generate a new set of operating codes.]

[19. An electronic game device as recited in claim 17 wherein said sensorially perceptible indications are synchronized with said multi-color light emitting means.]

[20. An electronic game device as recited in claim 17 further comprising addressing means to sequentially activate said multi-color light emitting means, for a predetermined time duration and in accordance with a predetermined activation sequence, in response to each activation of said entry control means.]

[21. An electronic game device as recited in claim 17 wherein said programming means provide the routing functions of a plurality of routing means each of which is depicted as a geometric square and comprises binary switching means and further comprises eight (8) ports (four input ports and four output ports) which are depicted to be located at the four (4) edges of the corresponding geometric square such that one input port and one output port are located at each edge of said square to provide eight (8) possible internal routes within the geometric square as follows:

a. if said binary switching means is set to "1", then:

(i) the input port at the bottom edge of the square connects to the output port at the top edge of the square, (ii) the input port at the left edge of the square connects to the output port at the right edge of the square, (iii) the input port at the right edge of the square connects to the output port at the bottom edge of the square, (iv) the input port at the top edge of the square connects to the output port at the left edge of the square, or b. if said binary switching means is set to "0", then:

(i) the input port at the bottom edge of the square connects to the output port at the right edge of the square, (ii) the input port at the left edge of the square connects to the output port at the top edge of the square, (iii) the input port at the right edge of the square connects to the output port at the left edge of the square, (iv) the input port at the top edge of the square connects to the output port at the bottom edge of the square.]

[22. An electronic game device as recited in claim 1 wherein each of said plurality of routing means is depicted as a geometric square and comprises binary switching means and further comprises eight (8) ports (four input ports and four output ports) which are depicted to be located at the four (4) edges of the corresponding geometric square such that one input port and one output port are located at each edge of said square to provide eight (8) possible internal routes within the geometric square as follows:

a. if said binary switching means is set to "1", then:

(i) the input port at the bottom edge of the square connects to the output port at the top edge of the square, (ii) the input port at the left edge of the square connects to the output port at the right edge of the square, (iii) the input port at the right edge of the square connects to the output port at the bottom edge of the square, (iv) the input port at the top edge of the square connects to the input port at the left edge of the square, or b. if said binary switching means is set to "0", then:

(i) the input port at the bottom edge of the square connects to the output port at the right edge of the square, (ii) the input port at the left edge of the square connects to the output port at the top edge of the square, (iii) the input port at the right edge of the square connects to the output port at the left edge of the square, (iv) the input port at the top edge of the square connects to the output port at the bottom edge of the square.]

[23. An electronic game device comprising:

a. a housing for the device, b. means for generating a plurality of codes hereinafter refered to as operating codes, c. plurality or entry control means, d. plurality of routing means defining a respective plurality of playing positions on the surface of said housing, each of said routing means being actuable by said entry control means to route said operating codes within the device, e. means to pictorially represent a plurality of images wherein each of said plurality of playing positions is indicated to provide a plurality of display positions, each of said display positions is used to indicate any of said plurality of images, f. means to generate a plurality of codes, hereinafter refered to as display codes, from said plurality of operating codes, g. means to route said display codes to said display positions in accordance with the determination of said routing means, h. means to activate each of said plurality of display positions to provide a pictorial representation of the received display code, i. means for varying the level of difficulty of any particular game, and j. sensorially perceptible indicating means responsive to said entry control means for generating a first sensorially perceptible indication corresponding to each activation of entry control means, a plurality of sensorially perceptible indications each of which is different from said first sensorially perceptible indication and corresponding to each of said plurality of images being displayed at all display positions, and a sensorially perceptible indication corresponding to the successful completion of a game.]

[24. An electronic game device as recited in claim 23 further comprising means to flash said display positions.]

[25. An electronic game device as recited in claim 23 wherein said means to generate a plurality of display codes includes means to implement a plurality of logic boolean functions.]

[26. An electronic game device as recited in claim 23 where said operating codes and display codes are binary.]

[27. An electronic game device as recited in claim 23 wherein said means to vary the level of difficulty of any particular game includes means for changing the apparent positions of said entry control means, the apparent positions of said display positions or both.]

[28. An electronic game device as recited in claim 23 wherein each of said plurality of display codes corresponds to either each of said plurality of predetermined images or to a blank display.]

[29. An electronic game device as recited in claim 23 further comprising means to provide a plurality of games.]

[30. An electronic game device as recited in claim 29 wherein said means to provide a plurality of games includes a microprocessor which generates sets of random operating codes for each new game.]

[31. An electronic game device as recited in claim 23 wherein each of said plurality of entry control means includes a key pad switch.]

[32. An electronic game device as recited in claim 23 wherein said sensorially perceptible indications are aural.]

[33. An electronic game device as recited in claim 32 wherein at least one of said aural outputs comprises a combination of successive tones of different frequencies.]

[34. An electronic game device as recited in claim 23 further comprising mode means for controlling said electronic game device to operate in a predetermined number of different levels of difficulty, said controlling means comprising manually operable means for selecting each of said predetermined number of different operating difficulty levels.]

[35. An electronic game device as recited in claim 23 including a microprocessor which comprises:

a. programming means to control the progress of the game, b. programming means to generate said sets of operating codes, c. programming means to monitor the actuation of said entry control means, d. programming means to simulate the operation of said routing means to route said operating codes within the device, e. programming means to compute said display codes from said operating codes by executing a plurality of predetermined boolean functions, f. programming means to randomly map the actual positions of said entry control means into a respective plurality of apparent entry control means in order to vary the difficulty of the game, g. programming means to randomly map the actual positions of said display positions into a respective plurality of apparent display positions in order to further vary the difficulty of the game, h. programming means to generate a plurality of graphic symbols, each of said graphic symbols corresponds to each of said plurality of images, i. programming means to address each of said plurality of display positions to automatically route each of said display codes to its respective display positions, in accordance with the determination of said routing mean, to provide said pictorial displays, j. programming means to control the flashing of said display positions, and k. programming means to generate a sequence of audio tones to produce said sensorially perceptible indications.]

[36. An electronic game device as recited in claim 35 further comprising controlling means for terminating the current game and initiating a new game, said controlling means comprising manually operable means to cause said device to reset its memory and generate a new set of operating codes.]

[37. An electronic game device as recited in claim 35 further comprising means for producing video signals, wherein each of said plurality of entry control means includes a key pad switch and wherein said plurality of display positions are provided on a video monitor.]

[38. An electronic game device as recited in claim 35 wherein said plurality of images include a geometric shape depicted in various colors.]

[39. An electronic game device as recited in claim 35 wherein said means for pictorially representing said plurality of images comprises an LCD display.]

[40. An electronic game device as recited in claim 35 wherein said means for pictorially representing said plurality of images comprises an LED display.]

[41. An electronic game device as recited in claim 35 wherein said sensorially perceptible indications are synchronized with said pictorially display means.]

[42. An electronic game device as recited in claim 35 wherein said programming means provide the routing functions of a plurality of routing means each of which is depicted as a geometric square and comprises binary switching means and further comprises eight (8) ports (four input ports and four output ports) which are depicted to be located at the four (4) edges of the corresponding geometric square such that one input port and one output port are located at each edge of said square to provide eight (8) possible internal routes within the geometric square as follows:

a. if said binary switching means is set to "1", then:

(i) the input port at the bottom edge of the square connects to the output port at the top edge of the square, (ii) the input port at the left edge of the square connects to the output port at the right edge of the square, (iii) the input port at the right edge of the square connects to the output port at the bottom edge of the square, (iv) the input port at the top edge of the square connects to the input port at the left edge of the square, or b. if said binary switching means is set to "0", then:

(i) the input port at the bottom edge of the square connects to the output port at the right edge of the square, (ii) the input port at the left edge of the square connects to the output port at the top edge of the square, (iii) the input port at the right edge of the square connects to the output port at the left edge of the square, (iv) the input port at the top edge of the square connects to the output port at the bottom edge of the square.]

[43. An electronic game device as recited in claim 23 wherein each of said plurality of routing means is depicted as a geometric square and comprises binary switching means and further comprises eight (8) ports (four input ports and four output ports) which are depicted to be located at the four (4) edges of the corresponding geometric square such that one input port and one output port are located at each edge of said square to provide eight (8) possible internal routes within the geometric square as follows:

a. if said binary switching means is set to "1", then:
   (i) the input port at the bottom edge of the square connects to the output port at the top edge of the square,
   (ii) the input port at the left edge of the square connects to the output port at the right edge of the square,
   (iii) the input port at the right edge of the square connects to the output port at the bottom edge of the square,
   (iv) the input port at the top edge of the square connects to the input port at the left edge of the square, or b. if said binary switching means is set to "0", then:
   (i) the input port at the bottom edge of the square connects to the output port at the right edge of the square,
   (ii) the input port at the left edge of the square connects to the output port at the top edge of the square,
   (iii) the input port at the right edge of the square connects to the output port at the left edge of the square,
   (iv) the input port at the top edge of the square connects to the output port at the bottom edge of the square.]

[44. An electronic game device comprising:

a. a housing for the device, b. means for generating 2N codes hereinafter referred to as operating codes wherein N represents an integer and N is greater than 1, c. $N^2$ entry control means, d. $N^2$ routing means defining a respective $N^2$ playing positions on the surface of said housing, each of said routing means being actuable by said entry control means to route said operating codes within the device, e. means to generate 2N codes, hereinafter referred to as color codes, from said operating codes, each of N of said color codes corresponds to each of N predetermined colors, the remaining N color codes correspond to a dark display, f. $N^2$ multi-color light emitting means, each of said light emitting means is associated with each of said $N^2$ playing positions, g. means to route said color codes to said light emitting means in accordance with the determination of said routing means, h. means to decode said color codes and activate said multi-color light emitting means, i. means for varying the level of difficulty of any particular game, and j. sensorially perceptible indicating means responsive to said entry control means for generating a first sensorially perceptible indication corresponding to each activation of the entry control means, N sensorially perceptible and distinct indications each of which corresponds to each of said N predetermined colors being displayed at all $N^2$ multi-color light emitting means and a sensorially perceptible indication corresponding to the successful completion of a game.]

[45. An electronic game device as recited in claim 44 wherein each of said $N^2$ routing means is depicted as a geometric square and comprises binary switching means and further comprises eight (8) ports (four input ports and four output ports) which are depicted to be located at the four (4) edges of the corresponding geometric square such that one input port and one output port are located at each edge of said square to provide eight (8) possible internal routes within the geometric square as follows:

a. if said binary switching means is set to "1", then:
   (i) the input port at the bottom edge of the square connects to the output port at the top edge of the square,
   (ii) the input port at the left edge of the square connects to the output port at the right edge of the square,
   (iii) the input port at the right edge of the square connects to the output port at the bottom edge of the square,
   (iv) the input port at the top edge of the square connects to the output port at the left edge of the square, or b. if said binary switching means is set to "0", then:
   (i) the input port at the bottom edge of the square connects to the output port at the right edge of the square,
   (ii) the input port at the left edge of the square connects to the output port at the top edge of the square,
   (iii) the input port at the right edge of the square connects to the output port at the left edge of the square,
   (iv) the input port at the top edge of the square connects to the output port at the bottom edge of the square.]

[46. A method of defining and solving a logic problem in an electronic logic game comprising the steps of:

a. matching a plurality of predetermined objects placed at the left and bottom edges of a square with identical objects placed at its top and right edges, b. using a plurality of playing pieces defined as routing squares and activated by binary switches to determine the internal routes within the square which interconnect all pairs of objects that belong to a predetermined subset of all possible pairs of said plurality of predetermined objects, c. designating a color or an image to each of said predetermined subsets, d. causing the color or image associated with each subset to be pictorially indicated at display locations associated with said plurality of playing pieces, as determined by said routing squares and in accordance with the positions of said binary switches, e. observing said displays for various combinations of binary switches whereby a combination associated with one subset may be discovered resulting in the same color or image being pictorially indicated at all display positions, and f. repeating the aforestated steps until all the combinations associated with all predetermined colors or images have been discovered.]

*47. An electronic game device, having a predefined objective, comprising:*

*a housing,*

*a playfield that includes a plurality of playing positions, wherein each playing position includes a display that provides a plurality of visual indications, and a keypad switch to activate the playing position,*

*a microprocessor to control the operation of the device, and*

*a control program executed on the microprocessor that assigns a first set of binary numbers to playing positions on the playfield; routes at least two binary numbers linked to the playing position activated by the player to each other, wherein at least one of the routed binary numbers is also associated with other playing position; generates a second set of binary numbers from said first set of binary numbers using a Boolean function, or a lookup table; assigns said second set of binary numbers to displays on the playfield to provide visual indications; and determines when a predefined objective of the game is met.*

*48. An electronic game device as recited in claim 47 wherein said keypad switch and display at each playing position are provided by an illuminated keypad switch.*

*49. An electronic game device as recited in claim 48 wherein the keypad switch is illuminated using light emitting means.*

*50. An electronic game device as recited in claim 49 wherein said light-emitting means is provided using multi-colored light emitting diodes.*

*51. An electronic game device as recited in claim 48, wherein said plurality of visual indications includes at least one illuminated color, and a color reflected from the surface of the display when it is dark.*

*52. An electronic game device as recited in claim 47 wherein said indicator is provided by at least one of a Liquid Crystal Display (LCD) screen, and a Cathode Ray Tube (CRT) screen.*

*53. An electronic game device as recited in claim 52, wherein said plurality of visual indications includes at least one image, and a visual indication resulting from the absence of an image at a playing position.*

*54. An electronic game device as recited in claim 47, further comprising means for generating visual and audible effects during game play, and at the conclusion of a game.*

*55. An electronic game device as recited in claim 47, further comprising a segment of the control program executed on the microprocessor that provides a plurality of games by varying the assignment of the first set of binary numbers to playing positions.*

*56. An electronic game device as recited in claim 47, further comprising means for varying the difficulty level of play.*

*57. An electronic game device as recited in claim 47, further comprising a plurality of games stored in a data section of the control program, wherein each game is defined by a different assignment of predefined binary numbers to playing positions.*

*58. An electronic game device as recited in claim 57, wherein said plurality of games is in various levels of difficulty.*

*59. An electronic game device as recited in claim 47, wherein the shape of said housing is in the form of a three-dimensional configuration, and wherein said plurality of playing positions are mapped on the surface of the three-dimensional configuration.*

*60. An electronic game device as recited in claim 47, wherein said control program includes a plurality of segments, and wherein the segment of control program that routes binary numbers to each other includes an algorithm that routes binary numbers assigned to the playing positions at the top, bottom, left, and right of the keypad switch activated by the player, to each other.*

*61. An electronic game device as recited in claim 47, wherein said first set of binary numbers is generated randomly.*

*62. An electronic game device as recited in claim 60, wherein said algorithm simulates the operation of a geometric configuration that comprises a plurality of internal routes to route binary numbers to each other, and wherein the geometric configuration has two states such that the first state is associated with at least one route, and the second state is associated with at least one alternate route.*

*63. An electronic game device as recited in claim 47, wherein said first set of binary numbers is predefined, and is stored as program data in a data section of the control program.*

*64. An electronic game device, having a predefined objective, comprising:*

*a playfield that includes a plurality of playing positions, wherein each playing position includes a display that provides a plurality of visual indications,*

*control means for activating any playing position,*

*a microprocessor to control the operation of the device,*

*means for assigning a first set of binary numbers to playing positions on the playfield,*

*means for routing at least two binary numbers respective to the playing position activated by the player to each other,*

*means for generating a second set of binary numbers from said first set of binary numbers,*

*means for assigning said second set of binary numbers to displays on the playfield to provide visual indications, and*

*means for determining if a predetermined objective of the game is met.*

*65. An electronic game device as recited in claim 64 further comprising a housing.*

*66. An electronic game device as recited in claim 65, wherein said control mechanism that activates any playing position includes keypad switches.*

*67. An electronic game device as recited in claim 64, further comprising means for generating a plurality of games.*

*68. An electronic game device as recited in claim 64, wherein said means for generating a second set of binary numbers employs a Boolean function, or a lookup table.*

*69. An electronic game device as recited in claim 64, wherein said first set of binary numbers is generated randomly.*

*70. An electronic game device as recited in claim 64, wherein said first set of binary numbers is predefined, and is stored in a data section of the control program.*

*71. An electronic game device as recited in claim 64, wherein said means for assigning said second set of binary numbers to displays includes an algorithm that employs the dynamic routes of the routing squares on the playfield.*

*72. An electronic game device as recited in claim 64, wherein said predetermined objective of the game is to reach a state during which all the indicators produce the same visual indication, and wherein said means for assigning said second set of binary numbers to displays is based on any permutation of assigning the elements of the second set of binary numbers to the displays.*

*73. An electronic game device as recited in claim 64, wherein said means for routing at least two binary numbers to each other includes an algorithm that simulates the operation of a geometric configuration that comprises a plurality of internal routes to route the binary numbers to each other, and wherein the geometric configuration has two states such that the first state is associated with at least one route, and the second state is associated with at least one alternate route.*

*74. An electronic game device, having a predetermined objective, comprising:*

*a playfield that includes a plurality of playing positions, wherein each playing position includes a display that provides a plurality of visual indications,*

*a switch control mechanism to enable a player to select and activate any playing position on the playfield,*

*a microprocessor to control the operation of the device,*

*a control program executed on the microprocessor that assigns a first set of binary numbers to playing positions on the playfield, routes at least two binary numbers linked to the playing position activated by the player to each other wherein at least one of the routed binary numbers is also associated with other playing position, generates a second set of binary numbers from said first set of binary numbers using a Boolean function or a lookup table, assigns said second set of binary numbers to displays on the playfield to provide visual indications, and determines if a predetermined objective of the game is met.*

*75. An electronic game device as recited in claim 74 further comprising a housing.*

*76. An electronic game device as recited in claim 74 further comprising a control program segment that provides a plurality of games by varying the assignment of binary numbers to playing positions on the playfield.*

*77. An electronic game device as recited in claim 74, wherein said control program includes a plurality of segments, and wherein the program segment that assigns the second set of binary numbers to displays is based on any permutation of assigning said second set of binary numbers to the displays.*

*78. An electronic game device as recited in claim 74, wherein the displays are implemented by light emitting means.*

*79. An electronic game device as recited in claim 78, wherein said plurality of visual indications includes at least one illuminated color, and one reflected color when a display is dark.*

*80. An electronic game device as recited in claim 78, wherein said light emitting means includes one, or a plurality of light emitting diodes at each playing position.*

*81. An electronic game device as recited in claim 80, wherein said plurality of light emitting diodes have different colors.*

*82. An electronic game device as recited in claim 74, wherein the displays are implemented using at least one of LCD screen, and CRT screen.*

*83. An electronic game device as recited in claim 74, wherein said plurality of visual indications includes a geometric shape in different colors.*

*84. An electronic game device as recited in claim 74, wherein said plurality of visual indications includes of at least one image, and a visual indication resulting from the absence of an image at a playing position.*

*85. An electronic game device as recited in claim 74, wherein said plurality of visual indications includes a plurality of images.*

*86. An electronic game device as recited in claim 74, wherein said first set of binary numbers is generated randomly.*

*87. An electronic game device as recited in claim 74, wherein said first set of binary numbers is predefined, and is stored in a data section of the control program.*

*88. An electronic game device as recited in claim 74, wherein said housing is in the form of a three-dimensional configuration, and wherein the plurality of playing positions is mapped on the surface of said three-dimensional configuration.*

*89. A method for an electronic game device, having a predefined objective, controlled by a microprocessor, having a playfield that includes a plurality of playing positions, wherein each playing position includes a display that provides a plurality of visual indications, and wherein the microprocessor performs the steps of:*

*assigning a first set of binary numbers to the playing positions,*

*routing at least two binary numbers linked to the playing position activated by the player to each other wherein at least one of the routed binary numbers is also associated with other playing position,*

*generating a second set of binary numbers from said first set of binary numbers,*

*assigning said second set of binary numbers to displays, and*

*determining if a predefined objective of the game is met.*

*90. A computer program embedded on a computer readable media, and performing the following steps:*

*assigning a first set of binary numbers to playing positions on a playfield,*

*routing at least two binary numbers linked to a selected playing position to each other wherein at least one of the routed binary numbers is also associated with other playing position,*

*generating a second set of binary numbers from said first set of binary numbers,*

*assigning said second set of binary numbers to displays associated with playing positions, and*

*determining if a predefined objective of the game is met.*

* * * * *

UNITED STATES PATENT AND TRADEMARK OFFICE

CERTIFICATE OF CORRECTION

PATENT NO. : RE 40,340 E
APPLICATION NO. : 08/962971
DATED : May 27, 2008
INVENTOR(S) : Nabil N. Ghaly It is certified that error appears in the above-identified patent and that said Letters Patent is hereby corrected as shown below:

1. Please replace FIG. 18 with attached replacement sheet.

2. Please replace FIG. 23 with attached replacement sheet.

3. Please replace FIG. 24 with attached replacement sheet.

4. Please include attached new sheet for FIG. 25.

5. Please include attached new sheet for FIG. 26.

6. Please include attached new sheet for FIG. 27.

7. Please include attached new sheet for FIG. 28.

Figure 27:
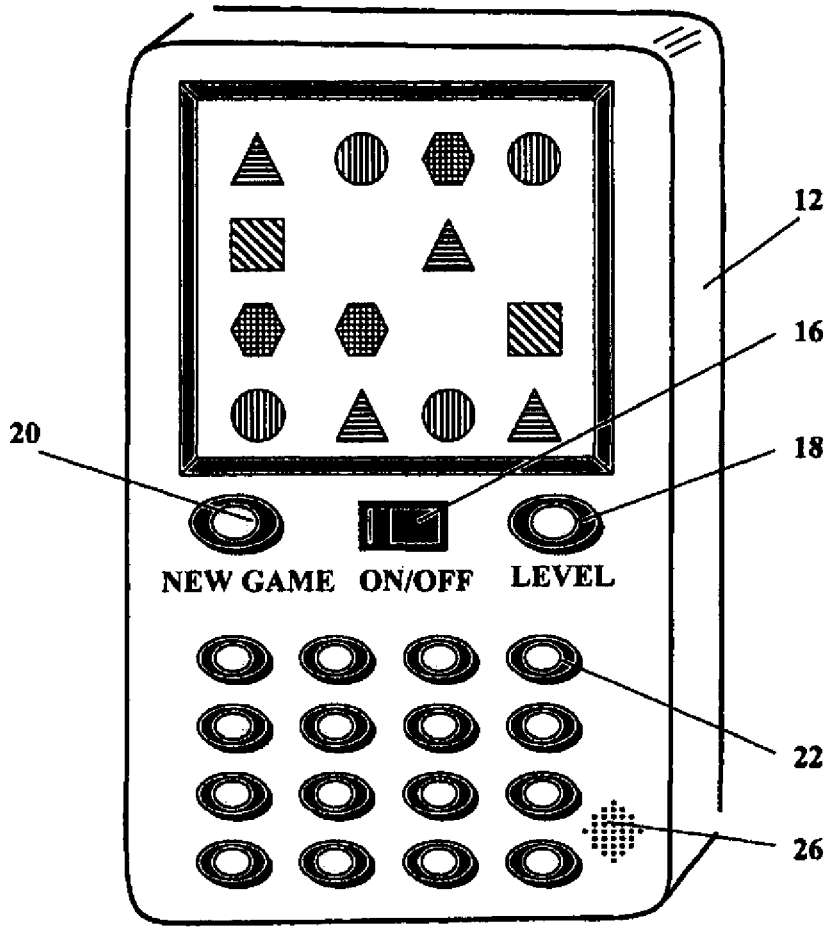

8. Please replace the paragraph at column 2, line 52, and ending at column 2, line 57, with the following paragraph:

In an alternative embodiment shown in FIG. 27, the device comprises a liquid crystal display whereon a plurality of geometric shapes may be depicted and wherein a player attempts to discover a pattern of switch positions that results in a singular geometric shape being depicted at all locations on the liquid crystal display.

Figure 28:
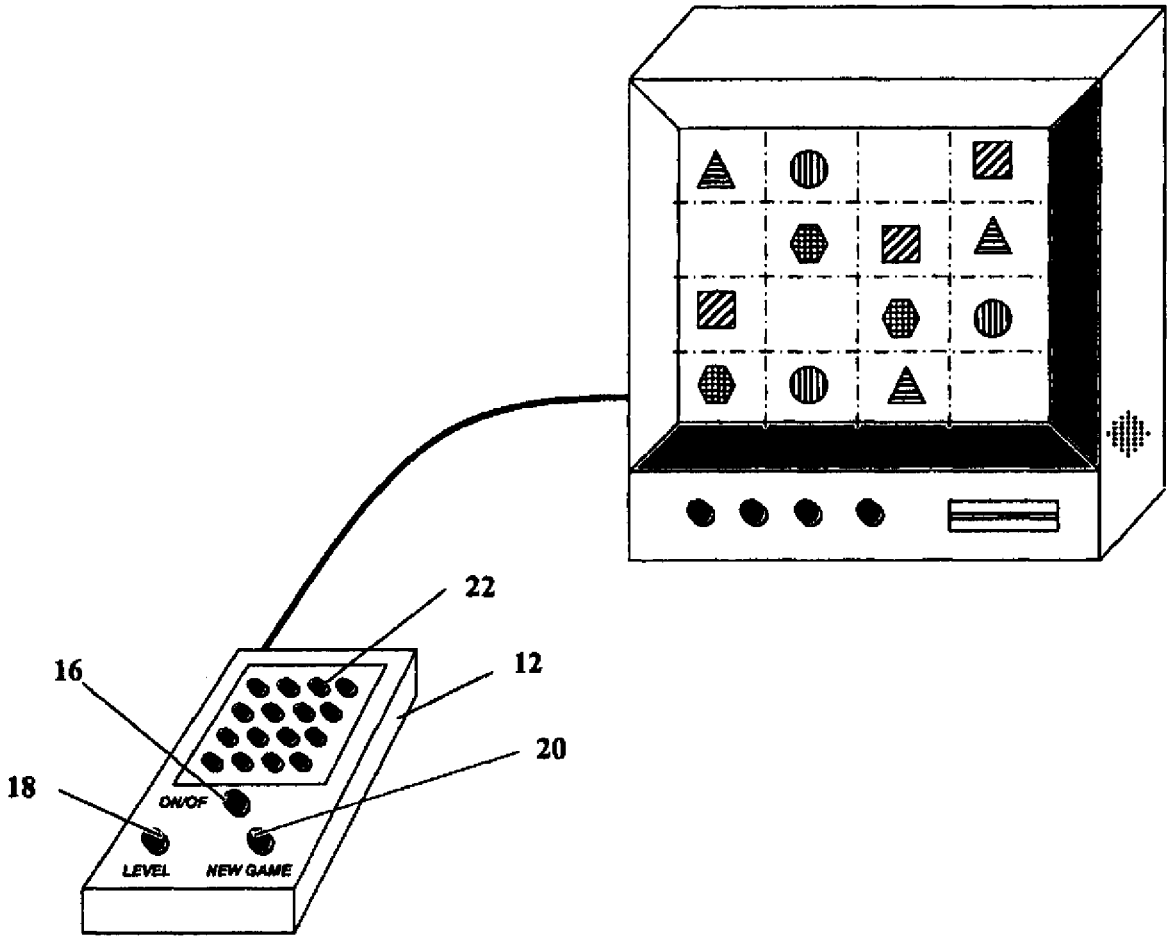

9. Please replace the paragraph at column 2, line 58, and ending at column 2, line 60, with the following paragraph:

In other alternative embodiments, the device comprises an interface module to provide multi-color displays, or images, on an external color video monitor. An example of such embodiments is shown in FIG. 28.

10. Please insert the following new paragraph after the paragraph ending at column 3, line 41:

It is certified that error appears in the above-identified patent and that said Letters Patent is hereby corrected as shown below:

--FIG. 25 indicates two examples of an embodiment, wherein the playing positions are mapped on the surface of a three-dimensional housing such as a sphere, or a cube.

FIG. 26 is a lookup table that illustrates the assignment of the color codes for the 4 x 4 embodiment to two colors.

FIG. 27 indicates an alternate embodiment using keypad switches, and a liquid crystal display screen.

FIG. 28 indicates an alternate embodiment that interfaces with an external video monitor to provide multi-color displays, or a plurality of images.--.

11. Please correct the paragraph at column 7, line 40 and ending at column 7, line 52 as follows:

It should be noted that the aforestated description of an algorithm to assign color codes to playing positions (as shown in FIGS. 21 & 22) is provided only as an example, and is not intended to limit the invention herein. As would be obvious to a person skilled in the art, there is almost unlimited number of ways to assign the generated color codes to playing positions. [For example, such assignment could be based on a fixed relationship between generated color codes and playing positions.] It should also be noted that a solution to a game, wherein the objective of the game is to provide the same color or image at all playing positions, is independent of how color codes or display codes are assigned to playing positions.

It is certified that error appears in the above-identified patent and that said Letters Patent is hereby corrected as shown below:

12. Please correct the paragraph at column 10, line 44 and ending at column 10, line 51, as follows:

It should be noted that while the above description of the operation of the preferred embodiment employs bi-stable switches to control the routing squares, a routing square could be activated by a keypad switch [, i.e., momentary switch,] to toggle it between its two states indicated in FIGS. 2a & 2b. [In such a case, the states of a routing square, rather than the states of the bi-stable switch, are used to provide the various functions described for the preferred embodiment] <u>It should also be noted that because a switch is an external device to a microprocessor that controls the operation of the device, and because a routing square is an internal element in the software that executes on the microprocessor, and since the states of a routing square reflect the activation of its associated external switch, it follows that the states of a routing square, rather than the states of an associated switch, are used to provide the various functions described for the preferred embodiment.</u>

13. Please correct the paragraph at column 10, line 52 and ending at column 10, line 61, as follows:

<u>Further, it should</u> [It should also] be noted that the number of colors or images playable by a device is a design choice. [The color codes in the 4x4 embodiment could be assigned to any pre-defined number of visual indications, i.e., to any pre-defined images or colors, including the color reflected from the surface of a display when it is

UNITED STATES PATENT AND TRADEMARK OFFICE

CERTIFICATE OF CORRECTION

PATENT NO. : RE 40,340 E
APPLICATION NO. : 08/962971
DATED : May 27, 2008
INVENTOR(S) : Nabil N. Ghaly It is certified that error appears in the above-identified patent and that said Letters Patent is hereby corrected as shown below:

dark. For the 4x4 embodiment, a person with ordinary skills in the art could employ such assignment to operate the device with 2, 3 ,4, or 5 colors or images. Similarly, for the 8x8 embodiment, the number of colors or images could be 2 to 9.] A game designer can vary the number of colors playable by a device by making each of the color codes to correspond to either each of a plurality of predetermined colors or to a dark indication. Similarly, a game designer can vary the number of images playable by a device by making each of the display codes to correspond to either each of a plurality of predetermined images or to a blank display.

Signed and Sealed this

Twenty-fifth Day of August, 2009

David J. Kappos

David J. Kappos
*Director of the United States Patent and Trademark Office*

LEGEND

| | |
|---|---|
| N | : DIMENSION OF LOGIC GAME = NUMBER OF PREDETERMINED COLORS WHICH MAY BE DISPLAYED, (EXCLUDED REFLECTED COLOR WHEN DISPLAY IS DARK) = 4 (FOR THE PREFERRED EMBODIMENT) |
| n | : NUMBER OF BINARY BITS IN OPCODE AND COLOR CODE = ln N + 1 = 3 (FOR THE PREFERRED EMBODIMENT) |
| I | : ROW NUMBER I, I = 1, ..., N |
| J | : COLUMN NUMBER J, J = 1, ..., N |
| DIR | : ROUTE DIRECTION BETWEEN TWO ADJACENT ROUTING SQUARES; "R" DENOTES RIGHT<br>"U" DENOTES UP<br>"L" DENOTES LEFT<br>"D" DENOTES DOWN |
| T | : OPCODE TRANSMITTER; T = 1, ..., 2N |
| R | : OPCODE RECEIVER; R = 1, ..., 2N |
| RC(T) | : RECEIVER CONNECTED TO TRANSMITTER "T" |
| TC(R) | : TRANSMITTER CONNECTED TO RECEIVER "R" |
| W(I,J) | : STATUS OF SWITCH LOCATED AT ROW "I" AND COLUMN "J," OR STATUS OF ROUTING SQUARE AT ROW "I" AND COLUMN "J" |
| TCODE(T) | : OPCODE AT TRANSMITTER "T" |
| RCODE(R) | : OPCODE AT RECEIVER "R" |
| C(R) | : COLOR CODE AT RECEIVER "R" |
| x(i) | : THE ith BIT OF OPCODE "X" |
| y(i) | : THE ith BIT OF OPCODE "Y" |
| cb(i) | : THE ith BIT OF COLOR CODE "C" |
| C1(I,J) | : COLOR CODE AT THE RIGHT EDGE OF THE ROUTING SQUARE LOCATED AT ROW "I" AND COLUMN "J" |
| C2(I,J) | : COLOR CODE AT THE TOP EDGE OF THE ROUTING SQUARE LOCATED AT ROW "I" AND COLUMN "J" |
| C(I,J) | : COLOR CODE SELECTED FOR DISPLAY AT THE ROUTING SQUARE LOCATED AT ROW "I" AND COLUMN "J" |
| $\oplus$ | : EXCLUSIVE OR BOOLEAN FUNCTION |
| $\odot$ | : EXCLUSIVE NOR BOOLEAN FUNCTION |

EXPLANATION OF PROGRAM VARIABLES OF FIGS. 19 – 22

FIG. - 18 -

| OPCODE | 000 | 001 | 010 | 011 | 100 | 101 | 110 | 111 |
|---|---|---|---|---|---|---|---|---|
| 000 | | | | | | | | |
| 001 | | | | | | | | |
| 010 | | | | | | | | |
| 011 | | | | | | | | |
| 100 | | | | | | | | |
| 101 | | | | | | | | |
| 110 | | | | | | | | |
| 111 | | | | | | | | |

| COLOR CODE | 100 | 101 | 110 | 111 | 0 - - |
|---|---|---|---|---|---|
| COLOR | | | | | |

COLOR ASSIGNMENT FOR N = 4

FIG. - 23 -

| OPCODE | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | | | | | | | | | | | | | | | | |
| 0001 | | | | | | | | | | | | | | | | |
| 0010 | | | | | | | | | | | | | | | | |
| 0011 | | | | | | | | | | | | | | | | |
| 0100 | | | | | | | | | | | | | | | | |
| 0101 | | | | | | | | | | | | | | | | |
| 0110 | | | | | | | | | | | | | | | | |
| 0111 | | | | | | | | | | | | | | | | |
| 1000 | | | | | | | | | | | | | | | | |
| 1001 | | | | | | | | | | | | | | | | |
| 1010 | | | | | | | | | | | | | | | | |
| 1011 | | | | | | | | | | | | | | | | |
| 1100 | | | | | | | | | | | | | | | | |
| 1101 | | | | | | | | | | | | | | | | |
| 1110 | | | | | | | | | | | | | | | | |
| 1111 | | | | | | | | | | | | | | | | |

| COLOR CODE | 1000 | 1001 | 1010 | 1011 | 1100 | 1101 | 1110 | 1111 | 0--- |
|---|---|---|---|---|---|---|---|---|---|
| COLOR | | | | | | | | | |

COLOR ASSIGNMENT FOR N = 8

FIG. - 24 -

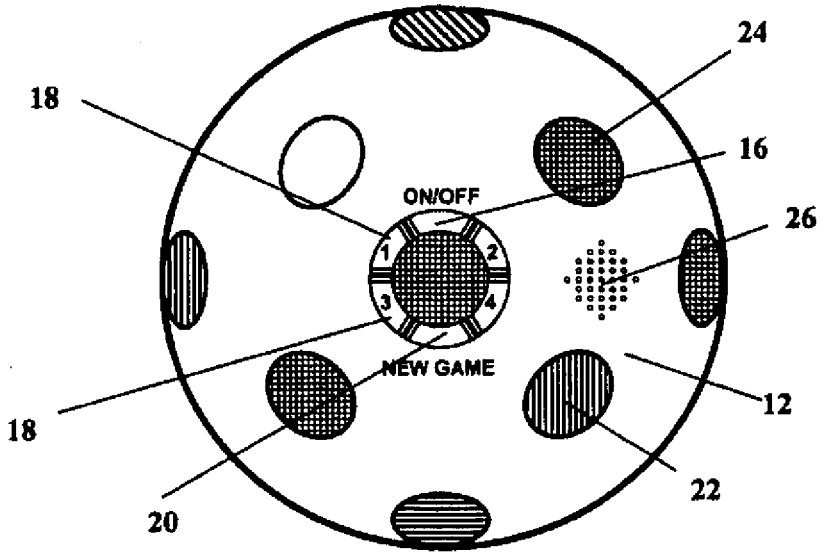
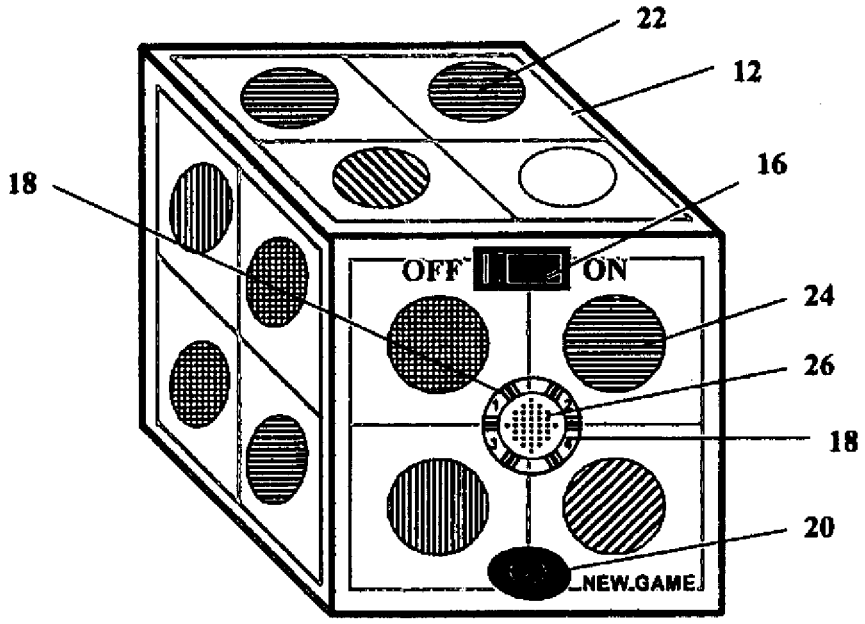
MAPPING OF INDICATORS ON 3 DIMENSIONAL CONFIGURATION
FIG. - 25 -

| OPCODE | 000 | 001 | 010 | 011 | 100 | 101 | 110 | 111 |
|---|---|---|---|---|---|---|---|---|
| 000 | | | | | | | | |
| 001 | | | | | | | | |
| 010 | | | | | | | | |
| 011 | | | | | | | | |
| 100 | | | | | | | | |
| 101 | | | | | | | | |
| 110 | | | | | | | | |
| 111 | | | | | | | | |

| COLOR CODE | 100 | 101 | 110 | 111 | 0 - - |
|---|---|---|---|---|---|
| COLOR | | | | | |

COLOR ASSIGNMENT FOR N = 4
(Color codes assigned to 2 colors)

FIG. - 26 -

ALTERNATE EMBODIMENT USING LCD SCREEN

CONNECTION TO VIDEO MONITOR